US012070049B2

United States Patent
Kumar et al.

(10) Patent No.: US 12,070,049 B2
(45) Date of Patent: Aug. 27, 2024

(54) METHOD OF USING BRANCHED-CHAIN FATTY ACIDS TO SUBSTANTIALLY EMULATE RUMINANT SENSORY PROFILES IN PLANT- AND CELL-BASED MEAT AND DAIRY PRODUCTS

(71) Applicant: Black Sheep Foods Inc., San Francisco, CA (US)

(72) Inventors: Sunny Kumar, San Francisco, CA (US); Ismael Montanez, San Ramon, CA (US); Jennifer Staton, El Cerrito, CA (US); Maryam Baniasadidehkordi, San Francisco, CA (US)

(73) Assignee: BLACK SHEEP FOODS INC., San Francisco, CA (US)

( * ) Notice: Subject to any disclaimer, the term of this patent is extended or adjusted under 35 U.S.C. 154(b) by 0 days.

(21) Appl. No.: 17/322,789

(22) Filed: May 17, 2021

(65) Prior Publication Data

US 2022/0361548 A1 Nov. 17, 2022

(51) Int. Cl.
  *A23L 29/00* (2016.01)
  *A23D 7/00* (2006.01)
  *A23J 3/22* (2006.01)

(52) U.S. Cl.
  CPC .............. *A23L 29/04* (2016.08); *A23D 7/003* (2013.01); *A23J 3/227* (2013.01); *A23V 2002/00* (2013.01)

(58) Field of Classification Search
  CPC ........... A23L 29/04; A23D 7/003; A23J 3/227
  See application file for complete search history.

(56) References Cited

FOREIGN PATENT DOCUMENTS

JP WO212/169627 A1 12/2012
WO WO-2012169627 A1 * 12/2012 ............. A23L 13/60

OTHER PUBLICATIONS

Channon et al. ("Sheepmeat flavor and odour:a review", Jul. 2003). (Year: 2003).*
Bourassa, Lacey ("The Beyond Burger: Everything You've Wanted to Know", May 19, 2020, Retrieved from Internet URL: https://www.plantproteins.co/beyond-burger-everything-youve-wanted-know/). (Year: 2020).*
Aaslyng et ano, "Meat flavor in pork and beef—from animal to meal"; Meat Science, Accepted Manuscript, Apr. 19, 2017.
Alonso et al., "Fatty acid composition of caprine milk: major, branched-chain, and trans fatty acids", J. Dairy Sci., 1999, pp. 878-884.
Alves et al., "Does the Fat Tailed Damara Ovine Breed Have a Distinct Lipid Metabolism Leading to a High Concentration of Branched Chain Fatty Acids in Tissues?" PLoS One Oct. 2013, vol. 8 (Issue 10): e77313 pp. 1-9.
Bai, et al., "Biosynthesis, regulation, and engineering of microbially produced branched biofuels", Biotechnol Biofuels, 2019, 12:84, pp. 1-12.
Bills, et al., "Free Fatty Acids and the Flavor of Diary Products"; J. Dairy Science, vol. 52, No. 8, 1969 pp. 1340-1345.

(Continued)

*Primary Examiner* — Stephanie A Cox
(74) *Attorney, Agent, or Firm* — Wilson Sonsini Goodrich & Rosati

(57) ABSTRACT

A plant-based food product that substantially emulates a ruminant meat may comprise one or more branched chain fatty acids to induce a sensory profile that is not significantly different from that of animal lamb, venison, or goat.

22 Claims, 13 Drawing Sheets

(56) References Cited

OTHER PUBLICATIONS

Bainbridge, et al., "Content and Composition of Branched-Chain Fatty Acids in Bovine Milk are Affected by Lactation Stage and Breed of Dairy Cow"; PLOS One, Mar. 1, 2016, pp. 1-17.
Brennand, et al., "Aroma Properties and Thresholds of Some Branched-Chain and Other Minor Volatile Fatty Acids Occurring in Milkfat and Meat Lipids"; Journal of Sensory Studies, 4, 1989; pp. 105-120.
Brennand, et alno.; "Distribution of Volatile Branched-Chain Fatty Acids in Various Lamb Tissues"; Meat Science 31, 1992, pp. 411-421.
Buckner, et al.; "Synthesis of Multimethyl-Branched Fatty Acids by Avian and Mammalian Fatty Acid Synthetase and its Regulation by Malonyl-CoA Decarboxylase in the Uropygial Gland"; Archives of Biochemistry and Biophysics, vol. 186, No. 1, Feb. 1978; pp. 152 163.
Cardinale, et al., "Effect of Methylmalonyl Coenzyme A, a Metabolite Which Accumulates in Vitamin B12 Deficiency, on Fatty Acid Synthesis"; The Journal of Biological Chemistry, vol. 245, No. 15, Issue of Aug. 10, 1970; pp. 3771-3775.
Channon, et. al., "Sheepmean flavour and odour: a review, Project No. Sheep CRC 1.3.2"; Department of Primary Industries, Victorian Institute of Animanl Science, Food Science Australia, Brisbane, Jul. 2003.
Corazzin et al., "Fatty Acid Profiles of Cow's Milk and Cheese as Affected by Mountain Pasture Type and Concentrate Supplementation"; Animals 2019, 9, 68; pp. 1-13.
Eibler et ano., "Enantioseparation and optical rotation of flavor-relevant 4-alkylbranched fatty acids"; Accepted Manuscript, Journal of Chromatography A, 2017.
Gerber, et al., "Tackling climate change through livestock—a global assessment of emissions and mitigation opportunities", Food nad Agricultural Organization of the United Nations, Rome, 2013.
Gofieau, et al., "Life with 6000 Genes"; Science, New Series, vol. 274, No. 5287; Genome Issue, Oct. 25, 1996.
Grabež, et al., "The relationship between volatile compounds, metabolites and sensory attributes: Acase study using lamb and sheep meat"; Small Ruminant Research 181 (2019), pp. 12-20.
Ha, et ano., "Volatile Branched-chain Fatty Acids and Phenolic Compounds in Aged Italian Cheese Flavors"; Journal of Food Science; vol. 56, No. 5; 1991; pp. 1241-1247.
Ha, et al., "Contributions of Cow, Sheep, and Goat Milks to Characterizing Branched-Chain Fatty Acid and Phenolic Flavors in Varietal Cheeses"; J. Dairy Sci., 74; 1991; pp. 3267-3274.
Ha, et ano., "Release of Volatile Branched-Chain and Other Fatty Acids from Ruminant Milk Fats by Various Lipases"; J. Dairy Sci. 76; 1993, pp. 677-690.
Hobson, et al. "The Rumen Microbial Ecosystem"; Blackie Academic & Professional, 1997.
"Lipid Metabolism in Ruminant Animals"; Editor Christie, Pergamon Press; Harfoot, "Anatomy, Physiology and Microbiology of the Ruminant Digestive Tract"; 1981.
Harper et al., "Branched-Chain Amino Acid Metabolism"; Am. Rev. Nur., 1984; 4; pp. 405-454.
Haushalter, et al., "Production of anteiso-branched fatty acids in *Escherichia coli*; next generation biofuels with improved cold-flow properties"; Metabolic Engineering 26, 2014, pp. 111-118.
Heinsman et al., :Lipase-mediated Resolution of Branched Chain Fatty Acids; Biocatalysis and Biotransformation, 2002, vol. 20 (5), pp. 297-309.
Heinrich, et al., "Löffler/Petrides Biochemie und Pathobiochemie", 2014.
Howard, et al., "Synthesis of customized petroleum-replica fuel moleucles by targeted modification of free fatty acid pools in *Escherichia coli*"; PNAS, May 7, 2013, Vo. 110 No. 19, pp. 7636-7641.
Jamora et al., "Flavor of Lamb and Mutton"; Quality Attributes of Muscle Foods, Kluwer Academic; Plenum Publishers, NY 1999.
Jiang, et al., "Enhanced Production of Branched-Chain Fatty Acids by Replacing"; Biotechnology and Bioengineering, vol. 112, No. 8, Aug. 2015, pp. 1613-1622.
Dewulf, et al., "The synthesis of branched-chain fatty acids is limited by enzymatic decarboxylation of ethylmethylmalonyl-CoA"; Biochemical Journal (2019), 476; pp. 2427-2447.
Kaneda, "Iso- and Anteiso-Fatty Acids in Bacteria: Biosynthesis, Function, and Taxonomic Significance"; Microbiological Reviews, Jun. 1991, pp. 288-302.
Karl et al., Stereoisomeric Flavour Compunds LXVIII. 2-, 3-, and 4-Alkyl-Branched Acids, Part 2: Chirospecific Analysis and Sansory Evaluation, Chirality 6: pp. 427-434 (1994).
Kim et al., "Method for the Quantitative Analysis of Volatile Free and Totla branched-Chain Fatty Acids in Cheese and Mild Fat1", J Dairy Sci No. 73, pp. 1988-1999, (1990).
Knothe et al., "Improving Biodiesel Fuel Properties by Modifying fatty ester compsition", Energy Environ. Sci., No. 2, pp. 759-766, (2009).
Knothe et al., "A Comprehensive Evaluation of the Melting Points of Fatty Acids and Esters Determinded by Differential Scanning Calorimetry", J. Am Oil Chem Soc. vol. No. 86; pp. 843-856, (2009).
Kolattukudy et al., "Synthesis of Methyl-Branched Fatty Acids from Methylmalonyl-CoA by Fatty Acid Synthase from Both the Liver and the Harderian Gland of the Guinea Pig1", Archives of Biochemistry and Biophysics, vol. 255, No. 1, pp. 205-209, May 15, 1987.
Lehninger et al., "Principles of Biochemistry", Sixth Edition, 2012.
Mazumder et al., "A New Enzyme in the Conversion of Propionyl Coenzyme A to Succinyl Coenzyme A*", Department of Biochemistry, vol. 236, No. 8, pp. PC53-PCT55 Aug. 1961.
Mazumder et al., "Metabolism of Propionic Acid in Aminal Tissues", The Journal of Biological Chemistry, col. 237, No. 10, Oct. 1962.
OECD-FAO Agricultural Outlook 2020-2029; FAO, Rome/OECD Publishing, Paris, 2020.
Oku et ano., "Biosynthesis of Branched-chain Fatty Acids in Bacillis subtilis"; The Journal of Biological Chemistry, vol. 263, No. 34, Issue of Dec. 5, pp. 18386-18396, 1998.
Oku et al., "Biosynthesis of Branched-chain Fatty Acid in Bacilli: FadD (malonyl-CoA:ACP transacylase) Is Not Essential for In Vitro Biosynthesis of Branched-chain Fatty Acids"; Bioscience, Biotechnology, and Biochemistry, 2003, 67:10, pp. 2106-2114.
Or-Rashid, et al., "Fatty acid composition of ruminal bacteria and protozoa, with emphasis on conjugated linoleic acid, vaccenic acid, and odd-chain and branched-chain fatty acids"; J. Anim. Sci., 2007, 85, pp. 1228-1234.
Pearson, et al., "Observations on the Contribution of Fat and Lean to the Aroma of Cooked Beef and Lamb", Journal of Animal Science, vol. 36, No. 3, 1973; pp. 511-515.
Ran-Ressler, et al., "Branched-chain fatty acid content of foods and estimated intake in the USA"; British Journal of Nutrition, 2014, 112, pp. 565-572.
Salles, et al., "Goat Cheese Flavor: Sensory Evaluation of Branched-Chain Fatty Acids and Small Peptides"; Journal of Food Science, vol. 67, No. 2, 2002, pp. 835-841.
Schwendel, et al., "Fatty acid profile differs between organic and conventionally produced cow milk independent of season or milking time"; J. Dairy Sci., 98, 2015; pp. 1-15.
Schwendel, et al., "Pasture feeding conventional cows removes differences between organic and conventionally produced milk", Food Chemistry, 2017, Accepted Manuscript.
Searchinger, World Resources Report—Ceating a Sustainable Food Future; Final Report Jul. 2019.
Kaffarnik, et al., "High Enantiomeric Excess of the Flavor Relevant 4-Alkyl-Branched Fatty Acids in Milk Fat and Subcutaneous Adipose Tissue of Sheep and Goat"; Journal of Agricultural and Food Chemistry, 2015, 63, pp. 469-475.
Taormina et al., "Branched-Chain Fatty Acids—An Underexplored Class of Dairy-Derived Fatty Acids"; Nutrients 2020, 12, 2875.
Unger et al., "Fatty Acid Content of Retail Cow's Milk in the Northeastern United States—What's in it for the Consumer?" Journal of Agricultural and Food Chemistry, 2020.

(56) References Cited

OTHER PUBLICATIONS

Vasta et ano., "Ruminant fat volatiles as affected by diet. A review"; Meat Science, 73, 2006, pp. 218-228.
Vlaeinck et al., "Factors affecting odd- and branched-chain fatty acids in milk: A review"; Science Direct, Animan Feed Science and Technology, 131, 2006, pp. 389-417.
Waite et ano., "Studies on the Mechanism of Fatty Acid Synthesis"; The Journal of Biological Chemistry, vol. 237, No. 9, Sep. 1962.
Wasserman et ano., "Organoleptic Identification of Roasted Beef, Veal, Lamb and Pork as Affected by Fat"; Journal of Food Science, vol. 33, 1968, pp. 219-223.
Wong, et al., "The contribution of 4-methyloctanoic (hircinoic) acid to mutton and goat meat flavour"; New Zealand Journal of Agricultural Research, 18:3, 1975, pp. 261-266.
Wong, et al., "Volatile Medium Chain Fatty Acids and Mutton Flavor"; J. Agric. Food Chem., vol. 23, No. 3, 1975, pp. 495-498.
Wong, et al., "Isolation of Precursors of Mutton Odor"; J. Agric. Food Chem., vol. 27, No. 6, 1979, pp. 1415-1416.
Woo, et ano., "Concentrations of Major Free Fatty Acids and Flavor Development in Italian Cheese Varities"; J. Dairy Sci., 67, pp. 960-968.
Yan et al., "Branched chain fatty acids positional distribution in human milk fat and common human food fats and uptake in human intestinal cells"; Jurnal of Functional Foods, 29, 2017, pp. 172-177.
Young et al., "Fat-borne Volatiles and Sheepmeat Odour"; Meat Science, vol. 45, No. 2, 1997, pp. 183-200.
Young et al., "Pastoral and species flavour in lambs raised on pasture, lucerne or maize"; J. Sci. Food Agric, 83, 2003, pp. 93-104.
Dong Han, et al.; "Characterization and comparison of flavor compounds in stewed pork with different processing methods", Elsevier, LWT—Food Science Technology, 144, pp. 1-10, 2021.
B. Sokolowska, et al; "Incidence of *Alicyclobacillus* Spp. in Polish Apple and Dark Berry Juice Concentrates and the Ability of Isolated A. Acidoterrestris Strains to Spoilage of These Juices", Postępy Nauki i Technologii Przemysłu Rolno-Spożywczego, 2016, 71, 1, pp. 5-20.
Y. Takakura, et al.; "Characterization of the key aroma compounds in pork soup stock by using an aroma extract dilution analysis", Bioscience, Biotechnology, and Biochemistry, 78:1, 124-129, 2014, DOI: 10.1080/09168451.2014.877184.
Z. He, et al.: "Effect of different sweeteners on the quality, fatty acid and volatile flavor compounds of braised pork", Frontiers in Nutrition, pp. 1-22, 2022.
D. Han, et al.; "Effect of Seasoning Addition on Volatile Composition and Sensory Properties of Stewed Pork", Foods, mdpi.com/journal/foods, 10, 83, pp. 1-30, 2021.
E. Pavan, et al.;"Relationships among Consumer Liking, Lipid and Volatile Compounds from New Zealand Commercial Lamb Loins", Foods, mdpi.com/journal/foods, 10, 1143, pp. 1-21, 2021.
R. G. Buttery, et al.; "Quantitative and Sensory Studies on Tomato Paste Volatiles", J. Agric. Food Chem. 1990, 38, pp. 336-340.
J. He, et al.: "Fatty acids and volatile flavor compounds in commercial plant-based burgers", Journal of Food Sciences, vol. 86, Iss. 2, pp. 293-305, 2021.
L. Riley; "Perception of orthonasal and retronasal aromas evoked by single compounds and complex flavor mixtures", Thesis Presented in Partial Fulfillment of the Requirements for the Degree Master of Science in the Graduate School of the Ohio State University, 2020, pp. 1-72.
M. D. Danyluk, et al.; "Prevalence, concentration, spoilage, and mitigation of *Alicyclobacillus* spp. in tropical and subtropical fruit juice concentrate", Food Microbiology, 28 (2011), pp. 472-477.

\* cited by examiner

METHOD OF USING BRANCHED-CHAIN FATTY ACIDS TO SUBSTANTIALLY EMULATE RUMINANT SENSORY PROFILES IN PLANT- AND CELL-BASED MEAT AND DAIRY PRODUCTS

FIELD OF THE INVENTION

The present invention relates to the field of plant- and cell-based products that may be designed to capture the flavor(s), texture(s), and aroma(s) of ruminant animal products.

BACKGROUND

Ecological and Economic Impacts of Meat Consumption

Climate change is one of the most pressing challenges ever to face humanity, posing a major threat to the well-being of global ecosystems and human societies. Anthropogenic greenhouse gas (GHG) emissions are among a number of causal factors of the greenhouse effect that causes climate change.

It has been discovered that ruminant livestock, that is, mammals with multi-compartment stomachs that comprise a section known as the rumen (e.g., cattle, sheep, goat, deer, elk), represent roughly 17.5% of global anthropogenic GHG emissions. It is also known that ruminant livestock use approximately two-thirds of global agricultural land making them a leading cause of biodiversity loss, deforestation, and land degradation and pollution. Additionally, it is known that beef and lamb have the largest carbon opportunity costs of any food product, and lamb and mutton in particular require the most land of any other food product per every 100 grams of protein produced.

A reduction in the consumption and production of ruminant animals—particularly in developed countries such as the United States where the consumption of ruminant animals such as beef is particularly high—may achieve critical reductions in GHGs known to contribute to adverse climate change and/or agricultural land loss and degradation.

Plant-based alternatives to ruminant animal meats that qualify as beef have been developed, such as products sold under the trade names of Impossible® Foods and Beyond® Meat. Yet, these ruminant animal meats do not properly emulate the full range of flavors and food qualities most closely associated with beef because they rely on heme as the foundation for beef flavor emulation.

With respect to non-beef ruminant animals, such as lamb, deer, and goat, there is no known plant-based, cell-based, or hybrid alternatives, including products that can emulate the gamey flavor and aroma typical of such non-beef ruminant animals.

Among many consumer preferences, taste has been found to be one of two top factors that persuade consumers to try plant-based meat alternatives. Taste is also considered the primary barrier for purchasing more plant-based alternatives. Thus, there is a need to develop a gamey flavor profile and aroma in plant- and cell-based meat products, and hybrids of the same, to induce more consumers to transition to more environmentally friendly and sustainable protein sources in their everyday diets, which either increases the sensation of meat flavors and/or aromas and/or decreases the sensation of vegetal flavors and/or aromas in the alternative meat product.

Animal Flavor Fundamentals

The flavors in animal products and their plant-based replacements may be separated into three parts: top, middle, and base notes. Notes are defined as the sequence of taste sensations that are recognized by consumers and remain on their palate and/or in their nasal cavity. Top notes include fatty/gamey sensations caused by the food compounds with lower molecular weight and higher volatility. Middle notes present themselves after the top notes and are described as making an immediate presence in the oral cavity. Middle notes may be a combination of umami, sour, and salty attributes, as well as different meaty attributes that had similar sensory profiles as beef and chicken. Base notes comprise general umami, gamey, fatty, or animal-specific notes, such as beef-like notes, goat-like notes, etc. There may be considerable overlap between the attributes associated with base and middle notes because these are the main attributes that linger on the palate or in the nasal cavity of the consumer.

Some exemplary flavor precursors that have been used to generate background or base notes in plant-based meat alternatives include carboxylic acids, amino acids, extracts, nucleosides and nucleotides, and carbohydrates. Exemplary carboxylic acid flavor precursors for background or base notes include, for example, acetic acid, citric acid, glycolic acid, lactic acid, lactones, succinic acid, or tartaric acid.

Exemplary amino acid flavor precursors for background or base notes include, for example, alanine, arginine, asparagine, aspartic acid, carnitine, carnosine, creatine, cysteine, cystine, cysteine sulfoxide, glutamic acid, glutamine, glutathione, glycine, histidine, isoleucine, lactotripeptides, leucine, lysine, methionine, DL-methionine, phenylalanine, proline, serine, threonine, tryptophan, tyrosine, valine, or 5-hydroxytryptophan.

Exemplary extract flavor precursors for background or base notes include, for example, acerola cherry extract, apple extract, beet extract, mushroom extract, malt extract, pomegranate extract, rosemary extract, strawberry extract, yeast extract.

Exemplary nucleoside and nucleotide flavor precursors for background or base notes include, for example, inosine, inosine monophosphate (IMP), guanosine, guanoside monophosphate (GMP), adenosine, adenosine monophosophate (AMP).

Exemplary carbohydrate flavor precursors for background or base notes include, for example, agar, alginate, amylose, amylopectin, acacia gum, arabinose, carrageenan, fenugreek gum, fructose, fructose-6-phosphate, fructose 1,6-diphosphate, glucose, glucose-6-phosphate, gluconic acid, glucuronic acid, glycogen, guar gum, inositol, lactose, locust bean gum, konjac glucomannan, maltodextrin, maltose, modified cellulose, modified starch, molasses, pectin, ribose, ribitol, sucrose, tapioca starch, xanthan gum, xylose and xylitol.

The prior art has attempted to emulate background flavor notes in meat alternatives using one or more of (i) a source of umami-like flavors, such as yeasts, (ii) amino acids with either a reducing sugar or other catalysts, and (iii) artificial or natural flavors. Additionally, attempts at achieving the fatty flavor has relied on varying types of plant-based fats including, but not limited to, sunflower, canola, and coconut oil, as well as cocoa butter. However, none of these prior attempts have been successful to substantially emulate non-beef ruminant animals, and still none of the background notes and general fattiness have been able to achieve the intensity desired by consumer taste preferences in current plant-based and cell-based meat product alternatives, including alternatives of beef and non-beef ruminant animals.

SUMMARY

Provided herein are protocols for analyzing, quantifying, and creating and modulating ruminant animal sensory profiles for plant-based, cell-based, and/or plant- and cell-based hybrid food products.

In an exemplary embodiment, a protocol is disclosed for selecting the ideal type and concentration of branched chain fatty acids (BCFAs) and Fatty Acids (FAs) necessary to impart desired ruminant flavors and/or aromas in plant-based, cell-based, and/or plant- and cell-based hybrid food products.

In various embodiments disclosed, BCFAs may be added into plant-based food products to thereafter impart ruminant flavor, aroma, and/or mouthfeel. In an exemplary plant-based food product with BCFAs, the product was found to have high intensity wild and heritage ruminant flavors and aromas in both top and background flavor notes.

In another embodiment, a plant-based food product incorporated BCFAs, flavor precursors, and plant-based fats/oils to achieve a flavor, aroma, and/or a mouthfeel that substantially emulated the flavor, aroma, and/or mouthfeel of a ruminant animal, such as cow, goat, sheep, or deer.

In an exemplary embodiment, a plant-based, cell-based, or plant/cell-based hybrid food product substantially emulating a ruminant product may comprise between 1 and 50 different types of BCFAs at concentrations ranging from approximately 0.001 ppm to approximately 4000 ppm.

In another exemplary embodiment, a plant-based, cell-based, or plant/cell-based hybrid food product substantially emulating an animal product may comprise between 1 and 50 different types of FAs at concentrations ranging from approximately 0.001 ppm to approximately 4000 ppm.

In yet another exemplary embodiment, the savory, meaty flavors and/or aroma of a plant-based, cell-based, or plant/cell-based hybrid food product substantially emulating a ruminant product may be adjusted by modifying one or more of the following: i) the type and concentration of BCFAs, ii) the location of the BCFAs in the plant-based matrix, iii) the pH of the food product, iv) flavor precursors, and v) concentrations or types of fatty acids.

In yet another exemplary embodiment, BCFAs may be used in plant- and cell-based pet foods to increase the likelihood of acceptance of plant and cell-based pet food by pets and/or promote more filling or desirable food products by domestic pets (e.g., dogs, cats) and other farmed animals (e.g., livestock, captive animals).

In an exemplary embodiment, a ruminant-flavored plant-based food product may comprise a plurality of branched-chain fatty acids disposed within one of the oil phase, water phase, or structured fat in the plant-based food product.

In an exemplary embodiment, a ruminant-flavored plant-based food product may comprise a plurality of branched-chain fatty acids disposed within one of the oil phase, water phase, or structured fat in the plant-based food product, wherein the plurality of branched chain fatty acids comprises at least two different branched chain fatty acids.

In an exemplary embodiment, a ruminant-flavored plant-based food product may comprise a plurality of branched-chain fatty acids disposed within one of the oil phase, water phase, or structured fat in the plant-based food product, wherein the plurality of branched chain fatty acids comprises 4-methyloctanoic acid, 4-methylnonanoic acid, 4-ethyloctanoic acid, 2-methylhexanoic acid, or combinations of the same.

In an exemplary embodiment, a ruminant-flavored plant-based food product may comprise a plurality of branched-chain fatty acids disposed within one of the oil phase, water phase, or structured fat in the plant-based food product, wherein the plurality of branched chain fatty acids comprises 4-methyloctanoic acid and 4-methylnonanoic acid.

In an exemplary embodiment, a ruminant-flavored plant-based food product may comprise a plurality of branched-chain fatty acids disposed within one of the oil phase, water phase, or structured fat in the plant-based food product, wherein the plurality of branched chain fatty acids consists essentially of 4-methyloctanoic acid and 4-methylnonanoic acid.

In an exemplary embodiment, a ruminant-flavored plant-based food product may comprise a plurality of branched-chain fatty acids disposed within one of the oil phase, water phase, or structured fat in the plant-based food product, wherein each of the plurality of branched chain fatty acids is a naturally produced branched chain fatty acid.

In an exemplary embodiment, a ruminant-flavored plant-based food product may comprise a plurality of branched-chain fatty acids disposed within one of the oil phase, water phase, or structured fat in the plant-based food product, wherein each of the plurality of branched chain fatty acids is a synthetically produced branched chain fatty acid.

In an exemplary embodiment, a ruminant-flavored plant-based food product may comprise a plurality of branched-chain fatty acids disposed within one of the oil phase, water phase, or structured fat in the plant-based food product, wherein the plurality of branched chain fatty acids comprises at least two different branched chain fatty acids and at least one is a naturally produced branched chain fatty acid.

In an exemplary embodiment, a ruminant-flavored plant-based food product may comprise a plurality of branched-chain fatty acids disposed within one of the oil phase, water phase, or structured fat in the plant-based food product, wherein the plurality of branched chain fatty acids comprises at least two different branched chain fatty acids and at least one is a synthetically produced branched chain fatty acid.

In an exemplary embodiment, a ruminant-flavored plant-based food product may comprise a plurality of branched-chain fatty acids disposed within one of the oil phase, water phase, or structured fat in the plant-based food product, wherein the plurality of branched chain fatty acids comprises at least two different branched chain fatty acids and at least one is a synthetically produced branched chain fatty acid and at least one is a naturally produced branched chain fatty acid.

In an exemplary embodiment, a ruminant-flavored plant-based food product may comprise a plurality of branched-chain fatty acids disposed within one of the oil phase, water phase, or structured fat in the plant-based food product, and a flavor precursor, a fatty acid, or a plant-based oil.

In an exemplary embodiment, a ruminant-flavored plant-based food product may comprise a plurality of branched-chain fatty acids disposed within one of the oil phase, water phase, or structured fat in the plant-based food product and a flavor precursor, a fatty acid, or a plant-based oil, wherein the plurality of branched chain fatty acids comprises at least two different branched chain fatty acids.

In an exemplary embodiment, a ruminant-flavored plant-based food product may comprise a plurality of branched-chain fatty acids disposed within one of the oil phase, water phase, or structured fat in the plant-based food product and a flavor precursor, a fatty acid, or a plant-based oil, wherein the plurality of branched chain fatty acids comprises 4-methyloctanoic acid, 4-methylnonanoic acid, 4-ethyloctanoic acid, 2-methylhexanoic acid, or combinations of the same.

In an exemplary embodiment, a ruminant-flavored plant-based food product may comprise a plurality of branched-chain fatty acids disposed within one of the oil phase, water phase, or structured fat in the plant-based food product and a flavor precursor, a fatty acid, or a plant-based oil, wherein the plurality of branched chain fatty acids comprises 4-methyloctanoic acid and 4-methylnonanoic acid.

In an exemplary embodiment, a ruminant-flavored plant-based food product may comprise a plurality of branched-chain fatty acids disposed within one of the oil phase, water phase, or structured fat in the plant-based food product and a flavor precursor, a fatty acid, or a plant-based oil, wherein the plurality of branched chain fatty acids consists essentially of 4-methyloctanoic acid and 4-methylnonanoic acid.

In an exemplary embodiment, a ruminant-flavored plant-based food product may comprise a plurality of branched-chain fatty acids disposed within one of the oil phase, water phase, or structured fat in the plant-based food product and a flavor precursor, a fatty acid, or a plant-based oil, wherein each of the plurality of branched chain fatty acids is a naturally produced branched chain fatty acid.

In an exemplary embodiment, a ruminant-flavored plant-based food product may comprise a plurality of branched-chain fatty acids disposed within one of the oil phase, water phase, or structured fat in the plant-based food product and a flavor precursor, a fatty acid, or a plant-based oil, wherein each of the plurality of branched chain fatty acids is a synthetically produced branched chain fatty acid.

In an exemplary embodiment, a ruminant-flavored plant-based food product may comprise a plurality of branched-chain fatty acids disposed within one of the oil phase, water phase, or structured fat in the plant-based food product and a flavor precursor, a fatty acid, or a plant-based oil, wherein the plurality of branched chain fatty acids comprises at least two different branched chain fatty acids and at least one is a naturally produced branched chain fatty acid.

In an exemplary embodiment, a ruminant-flavored plant-based food product may comprise a plurality of branched-chain fatty acids disposed within one of the oil phase, water phase, or structured fat in the plant-based food product and a flavor precursor, a fatty acid, or a plant-based oil, wherein the plurality of branched chain fatty acids comprises at least two different branched chain fatty acids and at least one is a synthetically produced branched chain fatty acid.

In an exemplary embodiment, a ruminant-flavored plant-based food product may comprise a plurality of branched-chain fatty acids disposed within one of the oil phase, water phase, or structured fat in the plant-based food product and a flavor precursor, a fatty acid, or a plant-based oil, wherein the plurality of branched chain fatty acids comprises at least two different branched chain fatty acids and at least one is a synthetically produced branched chain fatty acid and at least one is a naturally produced branched chain fatty acid.

In an exemplary embodiment, a ruminant-flavored plant-based food product may comprise a plurality of branched-chain fatty acids disposed within one of the oil phase, water phase, or structured fat in the plant-based food product, wherein each of the branched chain fatty acids is in a concentration between approximately 0.001 ppm and approximately 4000 ppm.

In an exemplary embodiment, a ruminant-flavored plant-based food product may comprise a plurality of branched-chain fatty acids disposed within one of the oil phase, water phase, or structured fat in the plant-based food product, wherein each of the branched chain fatty acids is in a concentration between approximately 0.001 ppm and approximately 4000 ppm, and preferably, between approximately 0.02 ppm and approximately 170 ppm.

In an exemplary embodiment, a ruminant-flavored plant-based food product may comprise a plurality of branched-chain fatty acids disposed within one of the oil phase, water phase, or structured fat in the plant-based food product, wherein each of the branched chain fatty acids is in a concentration between approximately 0.001 ppm and approximately 4000 ppm, and preferably, between approximately 0.02 ppm and approximately 170 ppm, and more preferably, between approximately 12 ppm and approximately 170 ppm.

In an exemplary embodiment, a ruminant-flavored plant-based food product may comprise a plurality of branched-chain fatty acids disposed within one of the oil phase, water phase, or structured fat in the plant-based food product, wherein each of the branched chain fatty acids is in a concentration between approximately 0.001 ppm and approximately 4000 ppm, and further comprising at least one fatty acid in a concentration between approximately 0.001 ppm and approximately 4,000 ppm.

In an exemplary embodiment, a ruminant-flavored plant-based food product may comprise a plurality of branched-chain fatty acids disposed within one of the oil phase, water phase, or structured fat in the plant-based food product, wherein each of the branched chain fatty acids is in a concentration between approximately 0.001 ppm and approximately 4000 ppm, and preferably, between approximately 0.02 ppm and approximately 170 ppm, and further comprising at least one fatty acid in a concentration between approximately 0.001 ppm and approximately 4,000 ppm.

In an exemplary embodiment, a ruminant-flavored plant-based food product may comprise a plurality of branched-chain fatty acids disposed within one of the oil phase, water phase, or structured fat in the plant-based food product, wherein each of the branched chain fatty acids is in a concentration between approximately 0.001 ppm and approximately 4000 ppm, and preferably, between approximately 0.02 ppm and approximately 170 ppm, and more preferably, between approximately 12 ppm and approximately 170 ppm, and further comprising at least one fatty acid in a concentration between approximately 0.001 ppm and approximately 4,000 ppm.

In an exemplary embodiment, a ruminant-flavored plant-based food product may comprise a plurality of branched-chain fatty acids disposed within one of the oil phase, water phase, or structured fat in the plant-based food product, wherein each of the branched chain fatty acids is in a concentration between approximately 0.001 ppm and approximately 4000 ppm, and further comprising at least one fatty acid in a concentration between approximately 0.001 ppm and approximately 4,000 ppm, and preferably, between approximately 0.28 ppm and approximately 2,000 ppm.

In an exemplary embodiment, a ruminant-flavored plant-based food product may comprise a plurality of branched-chain fatty acids disposed within one of the oil phase, water phase, or structured fat in the plant-based food product, wherein each of the branched chain fatty acids is in a concentration between approximately 0.001 ppm and approximately 4000 ppm, and preferably, between approximately 0.02 ppm and approximately 170 ppm, and further comprising at least one fatty acid in a concentration between approximately 0.001 ppm and approximately 4,000 ppm, and preferably, between approximately 0.28 ppm and approximately 2,000 ppm.

In an exemplary embodiment, a ruminant-flavored plant-based food product may comprise a plurality of branched-chain fatty acids disposed within one of the oil phase, water phase, or structured fat in the plant-based food product, wherein each of the branched chain fatty acids is in a concentration between approximately 0.001 ppm and approximately 4000 ppm, and preferably, between approximately 0.02 ppm and approximately 170 ppm, and more preferably, between approximately 12 ppm and approximately 170 ppm, and further comprising at least one fatty acid in a concentration between approximately 0.001 ppm and approximately 4,000 ppm, and preferably, between approximately 0.28 ppm and approximately 2,000 ppm.

In an exemplary embodiment, a ruminant-flavored plant-based food product may comprise a plurality of branched-chain fatty acids disposed within one of the oil phase, water phase, or structured fat in the plant-based food product, wherein each of the branched chain fatty acids is in a concentration between approximately 0.001 ppm and approximately 4000 ppm, and further comprising at least one fatty acid in a concentration between approximately 0.001 ppm and approximately 4,000 ppm, and preferably, between approximately 0.28 ppm and approximately 2,000 ppm, and even more preferably, between approximately 2.4 ppm and approximately 15 ppm.

In an exemplary embodiment, a ruminant-flavored plant-based food product may comprise a plurality of branched-chain fatty acids disposed within one of the oil phase, water phase, or structured fat in the plant-based food product, wherein each of the branched chain fatty acids is in a concentration between approximately 0.001 ppm and approximately 4000 ppm, and preferably, between approximately 0.02 ppm and approximately 170 ppm, and further comprising at least one fatty acid in a concentration between approximately 0.001 ppm and approximately 4,000 ppm, and preferably, between approximately 0.28 ppm and approximately 2,000 ppm, and even more preferably, between approximately 2.4 ppm and approximately 15 ppm.

In an exemplary embodiment, a ruminant-flavored plant-based food product may comprise a plurality of branched-chain fatty acids disposed within one of the oil phase, water phase, or structured fat in the plant-based food product, wherein each of the branched chain fatty acids is in a concentration between approximately 0.001 ppm and approximately 4000 ppm, and preferably, between approximately 0.02 ppm and approximately 170 ppm, and more preferably, between approximately 12 ppm and approximately 170 ppm, and further comprising at least one fatty acid in a concentration between approximately 0.001 ppm and approximately 4,000 ppm, and preferably, between approximately 0.28 ppm and approximately 2,000 ppm, and even more preferably, between approximately 2.4 ppm and approximately 15 ppm.

In an exemplary embodiment, a ruminant-flavored plant-based food product may comprise a plurality of branched-chain fatty acids disposed within one of the oil phase, water phase, or structured fat in the plant-based food product, further comprising a sensory profile not significantly different from that of a ruminant animal selected from the group consisting of lamb, goat, deer, or cow.

DETAILED DESCRIPTION

Applicable Sensory Protocol

Figure 1:
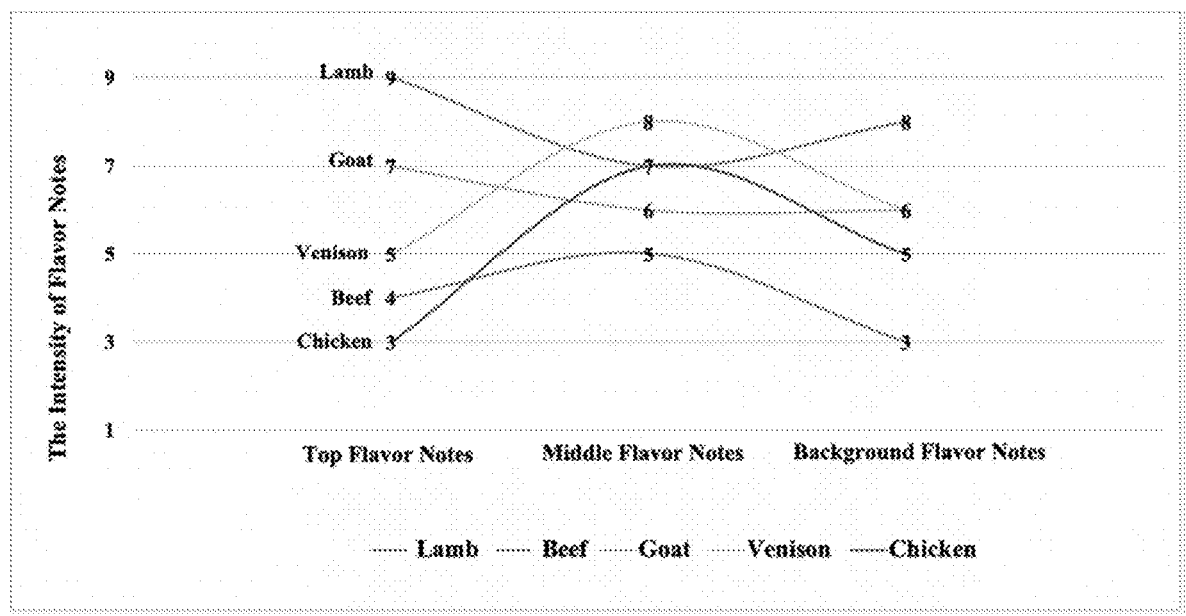
FIG. 1 is an exemplary graphical representation of intensity of flavor notes in selected animal meats using a 9-point intensity scale.

To evaluate the various embodiments disclosed herein, a sensory protocol may be employed to quantitively and qualitatively compare the flavors, aromas, and/or mouthfeel associated with a particular product, whether it is ruminant animal based, plant-based, cell-based, or hybrids of plant- and cell-based.

A trained (descriptive) sensory panel may be used to evaluate both quantitative and qualitative characteristics of meat and dairy alternatives. According to an exemplar sensory protocol utilized for the disclosed results herein, a total of 8-12 people were selected based on their ability to detect differences in characteristics and intensities of the sensory properties as well as using verbal descriptors and scaling methods. Panelists were introduced to the sensory properties, including aroma, appearance, texture, and flavor related attributes associated with ruminant meats (lamb, goat, beef, and venison) and dairy (milk, cheese, butter, and ice cream). Attributes could be reduced, added, and changed as the panelists went through training sessions and became more familiar with the products.

An array of products and prototypes were used as a frame of reference to introduce different attributes/descriptors to the panelists: lamb, beef, goat, venison, Beyond burger®, Impossible® burger, Lightlife® burger, and Boca® burger. After each training session, results were discussed and disputes in description were resolved by a sensory leader. After a minimum of 40 hours of training for each category (dairy or meat), a line scale was used to evaluate the intensity of each attribute. Panelists could apply the terminology they learned to describe the products.

Panelists were allowed to use numerous descriptors to describe the products that were not part of their training, although the protocol required a consensus among panelists in applying a description that is applicable to a particular product sample. In some cases, terms may have predefined descriptions in the relevant literature, such as "meatiness," which is defined as a general savory and meaty flavor and/or aroma according to Grabež et al., *The relationship between volatile compounds, metabolites and sensory attributes: A case study using lamb and sheep meat.* Small Ruminant Research, 181, 12-20 (2019), which is incorporated herein by reference in its entirety. The aforementioned protocol may contemplate such predefined descriptions in the relevant literature provided consensus in applying that definition by the panelists was involved. This consensus procedure ensures consistency in each panelist's evaluation of a particular sample.

According to the aforementioned exemplary sensory protocol, panelists were asked to refrain from eating, smoking, and drinking anything except water for at least one hour prior to the training and evaluation sessions. Panelists evaluated the products both individually by filling out questionnaires and in focus groups. Samples were evaluated in triplicates in a randomized order assigned with 3-digit codes.

To evaluate the aroma attributes in the food products, panelists were instructed to cut their samples to release more aroma volatiles and sniff it at least three times before recording their responses (both intensity and descriptors). After the evaluation of three samples, a 5-minute break was imposed to minimize fatigue and errors.

For evaluation of flavor and mouthfeel-related attributes, samples were served in a sequential monadic format. Panelists were required to rinse their mouths with filtered water, expectorate samples after each evaluation, and cleanse their palate with unsalted crackers after evaluating each sample. As with the evaluation of aroma attributes, a 5-minute break was imposed to minimize fatigue and errors after three samples.

The protocol described herein is applicable for quantifying sensory attributes of any ruminant animal and/or its plant-based, cell-based, or plant/cell-based hybrid analogue.

Exemplary Sensory Attributes of Ruminant Meat Products and Plant-Based Alternatives In an exemplary sensory profile, panelists were asked to evaluate and describe a total of thirty-four attributes associated with a ruminant meat or a ruminant-beef alternative: Aroma=5, Appearance=3, Texture=8, and Flavor=18 related attributes. Examples of such attributes may be found in Table 1 and Table 2 disclosed below.

The reference meat products used in Table 1 and Table 2 are selected from the following: (i) Impossible® Burger (purchased from Gus's Community Market, 2111 Harrison Street, San Francisco, CA 94110 within a week of manufacturing date, left to thaw in the box 4-6 hours in a refrigerator, separated from packaging thereafter, cooked as directed in a non-stick skillet at approximately 400° F., and the cooked product be left to rest for one minute); (ii) Boca® Burger (purchased from Gus's Community Market, 2111 Harrison Street, San Francisco, CA 94110 within a week of manufacturing date, left to thaw in the box 4-6 hours in a refrigerator, separated from packaging thereafter, cooked as directed in a non-stick skillet at approximately 400° F., and the cooked product be left to rest for one minute); (iii) Beyond Burger® (purchased from Gus's Community Market, 2111 Harrison Street, San Francisco, CA 94110 within a week of manufacturing date, left to thaw in the box 4-6 hours in a refrigerator, separated from packaging thereafter, cooked as directed in a non-stick skillet at approximately 400° F., and the cooked product be left to rest for one minute); (iv) raw lamb meat (purchased from Gus's Community Market, 2111 Harrison Street, San Francisco, CA 94110, where it was described as being sourced from Anderson Ranches in Brownsville, Oregon, 100% grass-fed, graze on open pastures, and slaughtered between 10 and 12 months of age); and (v) pan-seared lamb meat (the raw lamb meat of (iv) cooked in a non-stick skillet at approximately 400° F. for approximately 3 minutes on each side of the meat sample).

TABLE 1

Aroma Attributes

| No. | Aroma Attribute | Definition | Reference |
|---|---|---|---|
| 1 | Uncooked Aroma | Overall intensity of aroma upon opening the package, before cooking: associated with overall meaty/gamey, oxidized/rancid, and sourness aroma | Impossible ® burger |
| 2 | Cooked Aroma | Overall intensity of aroma when pan seared: Associated with overall meaty/gamey, and oxidized/rancid aroma | Pan-seared lamb meat |
| 3 | Uncooked Meaty/Gamey Aroma | he intensity of meaty aroma and the aroma associated with branched chain fatty acids and fatty acids in ruminant meats and milk such as lamb and goat | Raw lamb meat |
| 4 | Cooked Meaty/Gamey Aroma | The intensity of meaty aroma from Maillard reaction during cooking and the aroma associated with branched chain fatty acids and fatty acids in ruminant meats and milk such as lamb and goat | Pan-seared lamb meat |
| 5 | Oxidized/Rancid Aroma | Associated with oxidized fat/oil aroma | Impossible ® burger |

TABLE 1-continued

Aroma Attributes

| No. | Aroma Attribute | Definition | Reference |
|---|---|---|---|
| 6 | Sour Aroma | Associated with acidic sources such as citric acid, vinegar, or ascorbic acid | Impossible ® burger |
| 7 | Metallic-pan seared Aroma | The intensity of metal/iron aroma | Impossible ® burger |

TABLE 2

Flavor Attributes and Mouthfeel

| No. | Associated Note(s) | Flavor Attribute and Mouthfeel | Definition | Reference |
|---|---|---|---|---|
| 1 | Top | Overall intensity of Flavor | The overall intensity of flavors from basic tastes, cooked/seared meat, and vegetal flavor notes | Pan-seared lamb meat |
| 2 | Top/Middle/Base | Meatiness/Gamey Flavor | The intensity of meaty flavor and the flavor associated with branched chain fatty acids and fatty acids in ruminant meats and milk such as lamb and goat. | Pan-seared lamb meat |
| 3 | Middle/Base | Sourness | The taste associated with any source of acidity | Impossible ® burger |
| 4 | Middle/Base | Bitterness | The taste associated with any source of bitterness | Pan-seared lamb meat |
| 5 | Top/Middle/Base | Sweetness | The taste associated with any source of sweetness; in particular from sweet lactones | Pan-seared lamb meat |
| 6 | Middle/Base | Umaminess | The taste associated with any source of umami such as MSG and mushrooms | Pan-seared lamb meat |
| 7 | Top/Middle/Base | Fatty/Greasy taste | The taste associated with any source of fats/oils | Pan-seared lamb meat |
| 8 | Middle/Base | Vegetal Flavor | The overall impact of vegetal flavors including beany, grassy, and earthy | Beyond Burger ® |
| 9 | Middle/Base | Beany Flavor | Associated with beany/legume flavors | Boca ® Burger |
| 10 | Middle/Base | Grassy Flavor | Grainy and hay-like flavor with some green character of freshly mowed grass | Pan-seared lamb meat |
| 11 | Middle/Base | Earthy Flavor | Associated with earthy flavor in root vegetables such as potatoes, and beetroots or potting soil, dust, and sand | Pan-seared lamb meat |
| 12 | Base | Burning/Pungency Flavor | Associated with tingly/burning sensation from chemical irritants | Boca ® Burger |
| 13 | Middle/Base | Oxidized/Rancidity Flavor | Associated with oxidized/rancid oils | Boca ® Burger |
| 14 | Base | Metallic Flavor | The intensity of the iron compounds perceived by the oral cavity and olfactory pathways | Pan-seared lamb meat |
| 15 | Top | Overall balance Flavor | The roundness of flavor, lack of spike from any tastes or flavors | Pan-seared lamb meat |
| 16 | Base | Overall Intensity of Aftertaste | The overall intensity of aftertaste from basic tastes, seared lamb, and vegetal flavor notes | Impossible ® burger |
| 17 | Middle/Base | Meatiness/gamey Aftertaste | The intensity of meaty/gamey aftertaste in the mouth | Pan-seared lamb meat |
| 18 | Base | Bitter Aftertaste | The intensity of bitter aftertaste in the mouth | Beyond Burger ® |
| 19 | Top/Middle/Base | Fatty/Greasy mouthfeel | The residual of fat/oil in the oral cavity after swallowing | Pan-seared lamb meat |

A scale of intensity, from 1 (low intensity) to 9 (high intensity) was used to quantitively evaluate the products based on the above-identified attributes according to the aforementioned protocols. All sensory evaluation sessions were conducted in a controlled laboratory setting, which included isolated tastings and sensing of product by individual panelists (e.g., no group tastings or public/outdoor consumptions).

Identification of BCFA Impact on Ruminant Animal Sensory Profile

With reference to FIG. 1, exemplary aroma, flavor, and mouthfeel attributes may be diagrammatically shown using a scale of 1 (low intensity) to 9 (high intensity) for each attribute from Tables 1 and 2 that are associated with the overall intensity of a particular note (top, middle, base/background). As illustrated in FIG. 1, the intensity of the top notes is highest in lamb, goat, and venison. A key contributor to those top notes in these ruminant animal species is the branched chain fatty acid (BCFA), which tends to be perceived faster through the retronasal pathway and taste buds given their high volatility. As FIG. 1 illustrates, certain of the middle notes may linger in the oral cavity and blend with heavy and intense base notes (see, for example, flat or increasing intensities of notes in lamb and goat).

BCFAs are a subset of FAs and are key structural lipid constituents of bacterial membranes where they play an important regulatory role in membrane fluidity and permeability. In animals, as bacterial cells leaving the rumen pass to the ruminant duodenum, their membrane FAs, including BCFAs, are absorbed and subsequently incorporated into milk fat and other tissues. Rumen microorganisms are the origin of most bioactive FAs, including BCFAs found in ruminant-derived food products such as dairy, protein, and fermented products (e.g., milk, cheese). Exemplary BCFAs include any FA (saturated or unsaturated) with at least one branched alkyl group, typically located on the penultimate (iso) or antepenultimate (anteiso) carbon atoms in the chain. An exemplary BCFA may have its branches located in other positions on the FA chain such as even-numbered carbon atoms.

Exemplary BCFAs include, but are not limited to, 2-methylbutanoic acid, 3-methylbutanoic acid, 2-methylpentanoic acid, 3-methylpentanoic acid, 4-methylpentanoic acid, 2-methylhexanoic acid, 4-methylhexanoic acid, 2-ethylhexanoic acid, 2-methylheptanoic acid, 4-methylheptanoic acid, 5-methylheptanoic acid, 6-methylheptanoic acid, 4-ethylheptanoic acid, 4-methyloctanoic acid, 6-methyloctanoic acid, 2,2-dimethyloctanoic acid, 3,6-dimethyloctanoic acid, 3,6-dimethyloctanoic acid, 4-ethyloctanoic acid, 4-methylnonanoic acid, 2-methylnonanoic acid, 8-methylnonanoic acid, 2,2-dimethylnonanoic acid, 3,6-dimethylnonanoic acid, 2-ethyldemayoic acid, 2-methydemayoic acid, 3-methyldemayoic acid, 4-methyldemayoic acid, 8-methyldemayoic acid, 9-methyldemayoic acid, 2,2-dimethyldemayoic acid, 2,5-dimethyldemayoic acid, 3,5-dimethyldemayoic acid, 11-methyltridemayoic acid, 12-methyltridemayoic acid, 10-methyltetrademayoic acid, 11-methyltetrademayoic acid, 12-methyltetrademayoic acid, 13-methyltetrademayoic acid, 14-methylpentademayoic acid, 15-methylhexademayoic acid, 14-methylhexademayoic acid, 16-methylheptademayoic acid, 17-methyloctademayoic acid, 18-methylnonademayoic acid, 12-methyleicosanoic acid, and 18-methyleicosanoic acid.

Even, odd, and branched-chain volatile FAs include, for example, Butanoic acid, Pentanoic acid, Pentenoic acid, Hexanoic acid, Heptanoic acid, Octanoic acid, 2-Octenoic acid, 7-Octenoic acid, Nonanoic acid, Nonenoic acid, Demayoic acid, 9-Decenoic acid, Undemayoic acid, Dodemayoic acid, Dodecenoic acid, Tetrademayoic acid, Pentademayoic acid, Hexademayoic acid, Heptademayoic acid, Octademayoic acid, Nonademayoic acid, Eicosanoic acid, Heneicosanoic acid, and Docosanoic acid. Such FAs have been shown to provide characteristic flavor and aroma profiles in ruminant meat and dairy products. More than 50 BCFAs have been identified in ruminant-derived fats.

BCFA distributions in ruminant-derived dairy, protein, and fermented products contained approximately 1.0 to approximately 3.0 wt % of BCFAs as compared to total FAs. In contrast, less than 0.003 wt % of BCFA content was found in non-ruminant derived products such as ground turkey, chicken breasts, chicken thighs, pork sausages, ham, bacon, fresh salmon, eggs, tofu, tempeh, and kimchi. Though ruminant-derived products contain similar amounts of BCFAs, flavor and aroma attributes are known to vary significantly across and within species, which may be attributable to species, age, sex, diet, or tissue or fat locale within the animal.

Exemplary characteristic ruminant flavors, aromas, and/or mouthfeel, such as those in Table 1 and Table 2, are believed to be a combination of (i) characteristics derived from individual BCFAs, (ii) the ratios between various BCFAs, and (iii) general meatiness, as previously described in the literature.

It has been discovered that specific and specialized combinations of 'meaty' flavor compounds and specific BCFAs may recreate ruminant animal flavors, aromas, and mouthfeel characteristics in plant-based, cell-based, or plant/cell-based hybrid products. By adding appropriately placed BCFAs into plant-based, cell-based, or plant/cell-based hybrid food products, those plant-based food products may substantially emulate the sensory attributes and profiles associated with animal-based ruminant products.

It has also been discovered that a BCFA-induced ruminant sensory profile of a plant-based, cell-based, or plant/cell-based hybrid product may be adjusted and tuned by the type and concentration of BCFAs and FAs, the pH of the food product, the timing and location of introduction of the BCFAs into the plant-based food product, and the addition of one or more flavor precursors.

BCFA Selection

Selection of BCFAs and their respective ratios for use in a plant-based, cell-based, or plant/cell-based hybrid product may be one important factor in the process of reproducing ruminant flavors and aromas.

For example, 2-ethyl-, 4-methyl-, and 4-ethyl-branched chain fatty acids have been identified in depot fat, muscle tissue, and milkfat and were found to exhibit intense goat/sheep-like aromas and flavors. However, it is known that BCFAs in natural ruminant animal meats do not generate these aromas and flavors in isolation or sequentially, but that these BCFAs synergistically achieve these aromas and flavors in the ruminant animal meat product in unique and unexpected combinations.

The synergistic flavor and aroma production in ruminant animal meat has also been found to involve BCFAs and FAs acting together. In one example, a synergistic flavor effect was found when adding FAs to BCFAs with the same homologous series (e.g., C4:0 through C12:0). In another example, a combination of heptenoic, caprylic, 2-methyloctanoic, octenoic, 4-methyloctanoic, 6-methyloctanoic, nonanoic, 4, 6-dimethyloctanoic, nonenoic, 4-methylnonanoic, and 8-methylnonanoic acids provided an overall mutton-like flavor and aroma. However, it was also found that reducing the presence of 4-ethyloctanoic, 4-methyloctanoic, 4-methylnonanoic, and 2-ethyloctanoic acid BCFAs resulted in flavors and aromas more closely related to beef ruminant animal products.

In Vivo, In Vitro, and Synthetic BCFA Production

In live ruminant animals, BCFAs may be produced via a natural fermentation process in the rumen. This same fermentation process may be replicated in a lab setting using both animal- and non-animal-derived sources. Alternatively, BCFAs may be produced chemically via a series of different reactions. Depending on the exact reactions that take place and their precursors, such reactions may lead to the production of either natural or synthetic BCFAs.

Figure 2:
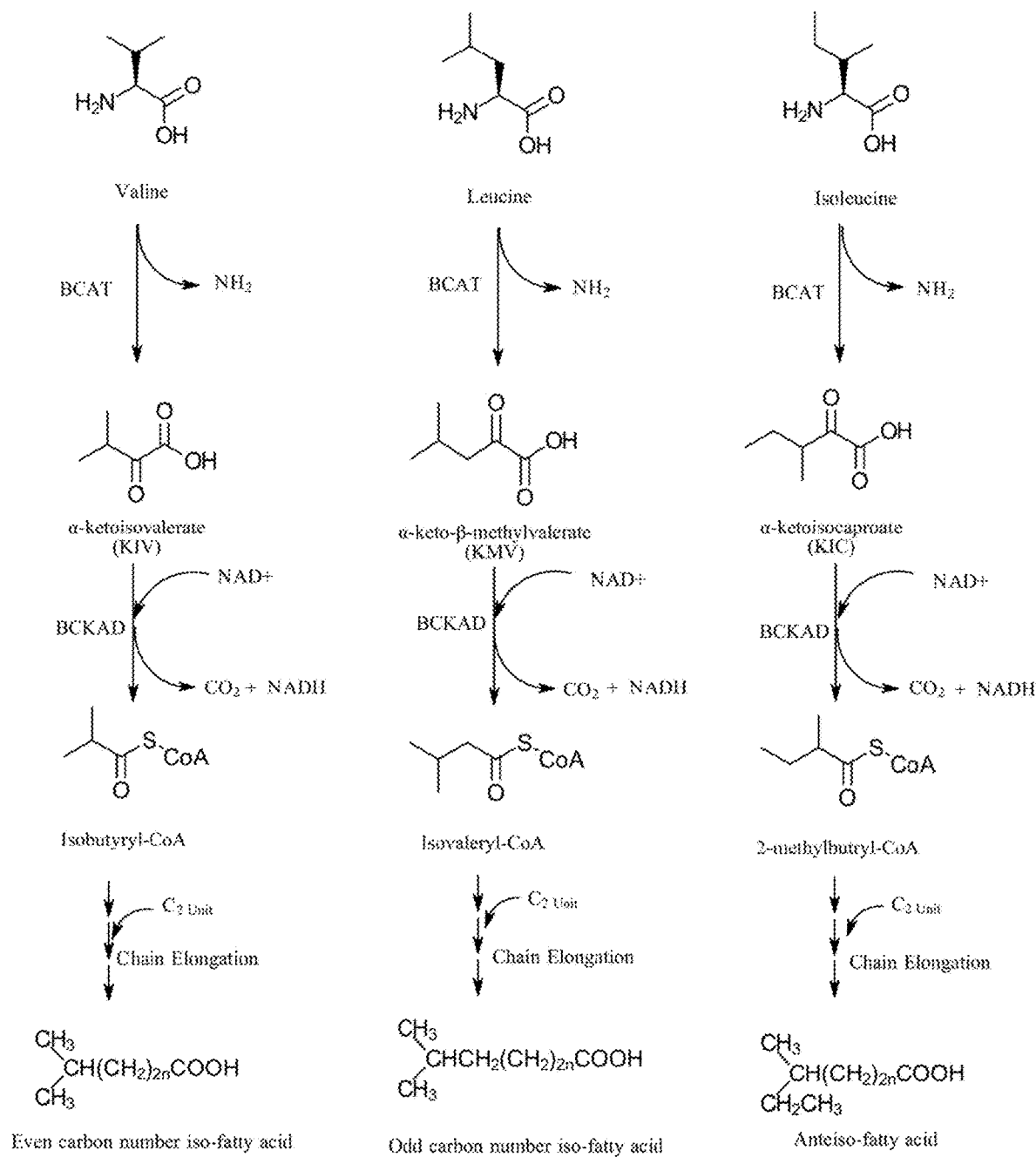
FIG. 2 is an exemplary overview of the natural pathway for iso- and anteiso-BCFAs that takes place in the rumen.

FIG. 2 illustrates an exemplary naturally occurring process of BCFA synthesis in ruminants by which monomethyl BCFAs are synthesized by bacteria and protozoa in the rumen. With reference to FIG. 2, rumen microorganisms utilize dietary branched-chain amino acids (BCAAs), (i.e., valine, leucine, and isoleucine) to generate BCFAs. These BCAAs are transformed into branched chain α-ketoacids through the removal of the amino group by a BCAA transferase enzyme (BCAT). These α-ketoacid products, α-ketoisovalerate (ketovaline, KIV), α-keto-β-methylvalerate (ketoisoleucine, KMV), and α-ketoisocaproate (Ketoleucine, KIC), are subsequently decarboxylated by branched-chain-α-ketoacid dehydrogenase (BCKAD), producing the respective branched short-chain carboxylic acids isobutyryl-CoA, isovaleryl-CoA, and 2-methylbutyryl-CoA. Subsequently, branched short-chain carboxylic acids are elongated by BCFA synthetase, with malonyl-CoA as the chain extender, to form iso- and anteiso-BCFAs.

Figure 3:
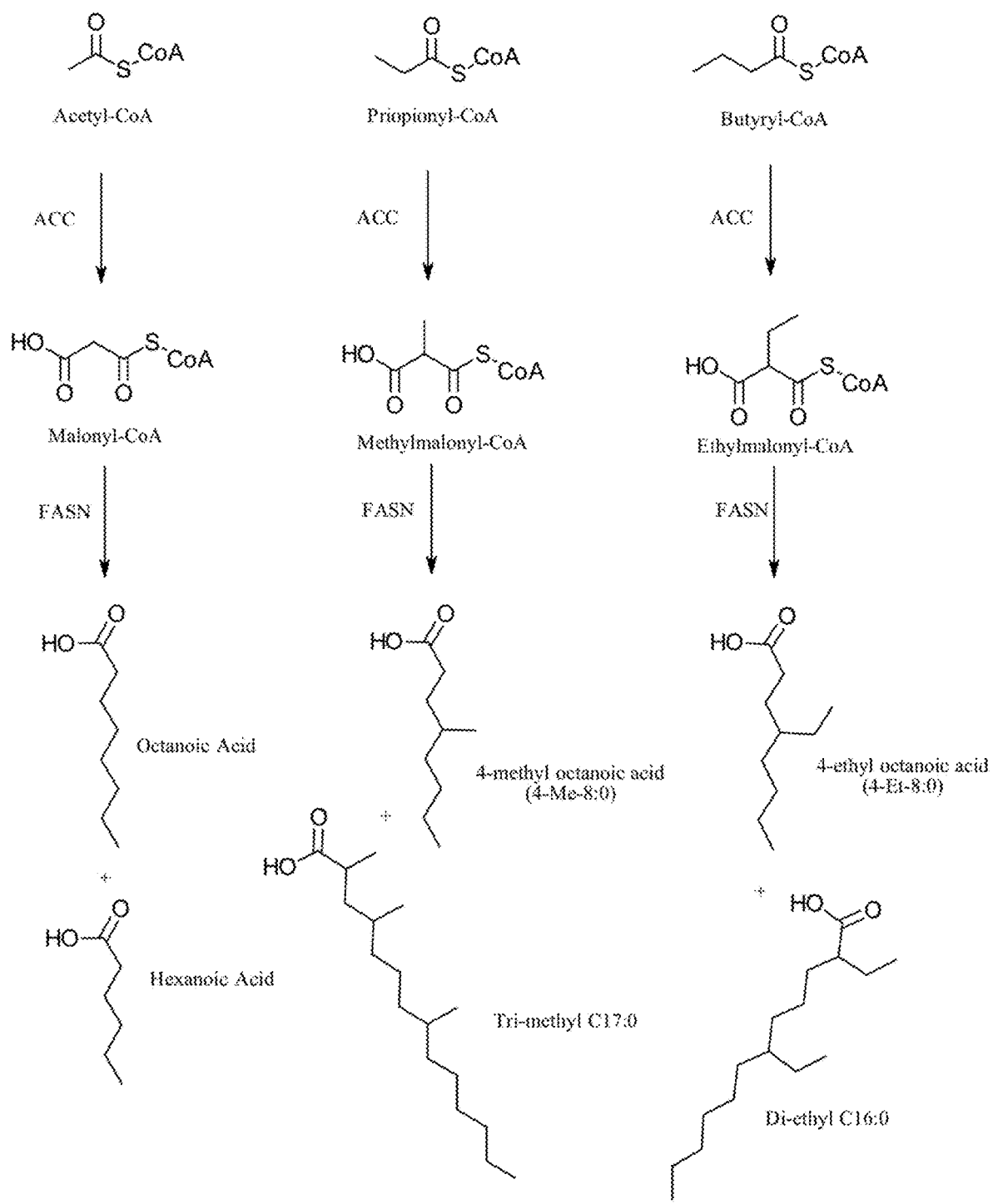
FIG. 3 is an exemplary overview of the natural pathway for non iso- and non anteiso-BCFAs that takes place in the rumen.
Figure 4:
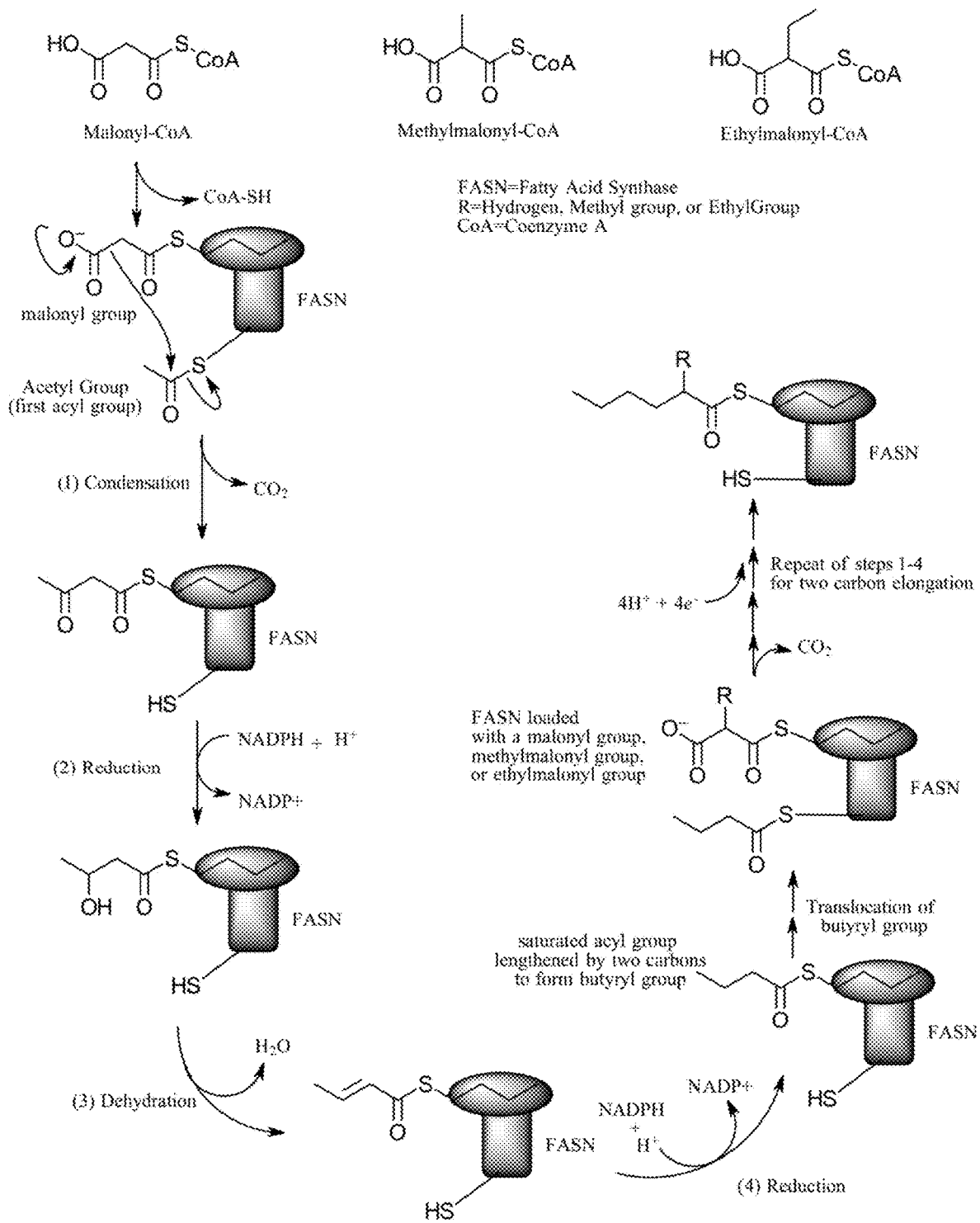
FIG. 4 is an exemplary depiction of a natural pathway for branched and unbranched fatty acid biosynthesis.

FIG. 3 and FIG. 4 each illustrate alternative in vivo synthesis of BCFAs within animal rumen, the BCFAs containing multiple or single methyl or ethyl groups on locations other than the iso- and anteiso-position of the main FA. With reference to both FIG. 3 and FIG. 4, the illustrative pathway may leverage a dual substrate promiscuity of acetyl-CoA carboxylase (ACC) and FA synthase (FASN). The aforementioned dual substrate promiscuity may be defined as the incorporation of non-traditional substrates by an enzyme to produce side reactions in addition to their main catalytic activity. This dual substrate promiscuity of ACC has been shown via synthesis of malonyl-CoA, methylmalonyl-CoA, and ethylmalonyl-CoA from acetyl-CoA, propionyl-CoA, and butyryl-Coa, respectively. While FIG. 3 illustrates a pathway in which FASN may use malonyl-CoA to extend FA chains, FIG. 4 illustrates a pathway whereby methylmalonyl-CoA may be used in place of malonyl-CoA for FA extension, generating mono- and multi-methyl-branched FAs. As further illustrated by FIG. 3 and FIG. 4, an alternative use of FASN may be to incorporate ethylmalonyl-CoA in FA extension, generating mono- and multi-ethyl-branched FAs. In the case in which BCFAs (or FAs) have an odd number of carbons making up its chain (such as 4-methylnonanoic acid), it is believed that this naturally occurs through the incorporation of a propionyl group as a primer in place of an acetyl group in the first step of lipid synthesis. Alternatively, an odd chain FA may be formed via alpha oxidation of an even chain FA.

In vitro BCFA production may be accomplished via fermentation or large-scale extraction of cell cultures in a lab setting. For example, BCFA production may be engineered using *Escherichia* (*E.*) *Coli*. However, in all cases, a heterologous branched-chain α-ketoacid dehydrogenase complex (BKD, consisting of LpdV, BkdAA, BkdAB, and BkdB) was expressed to convert branched-chain α-ketoacids into branched-chain α-ketoacyl-CoA starters (BCCSs). A branched-chain-specific FabH (βKetoacyl-(acyl-carrier-protein) Synthase III) was then used to incorporate BCCSs to enter FA elongation. As a second example of in vitro BCFA synthesis via a fermentation process outside of the rumen, *Bacillus Subtilis* has also been shown to produce BCFAs via decarboxylation of branched chain ketoacids via a branched-chain-α-ketoacid dehydrogenase.

Another alternative source of BCFAs is via synthetic precursors. However, the inventors have found surprising improvements in the development of ruminant animal flavors, aromas, and mouthfeel through use of natural BCFAs produced using natural precursors, as may be found with reference to aroma and flavor of burgers made with natural BCFAs (burgers 2, 3, and 7 in FIG. 10 and FIG. 11) as compared to the aroma and flavor of burgers made with synthetic BCFAs (burgers 5 and 6 in FIG. 10 and FIG. 11).

Figure 5:
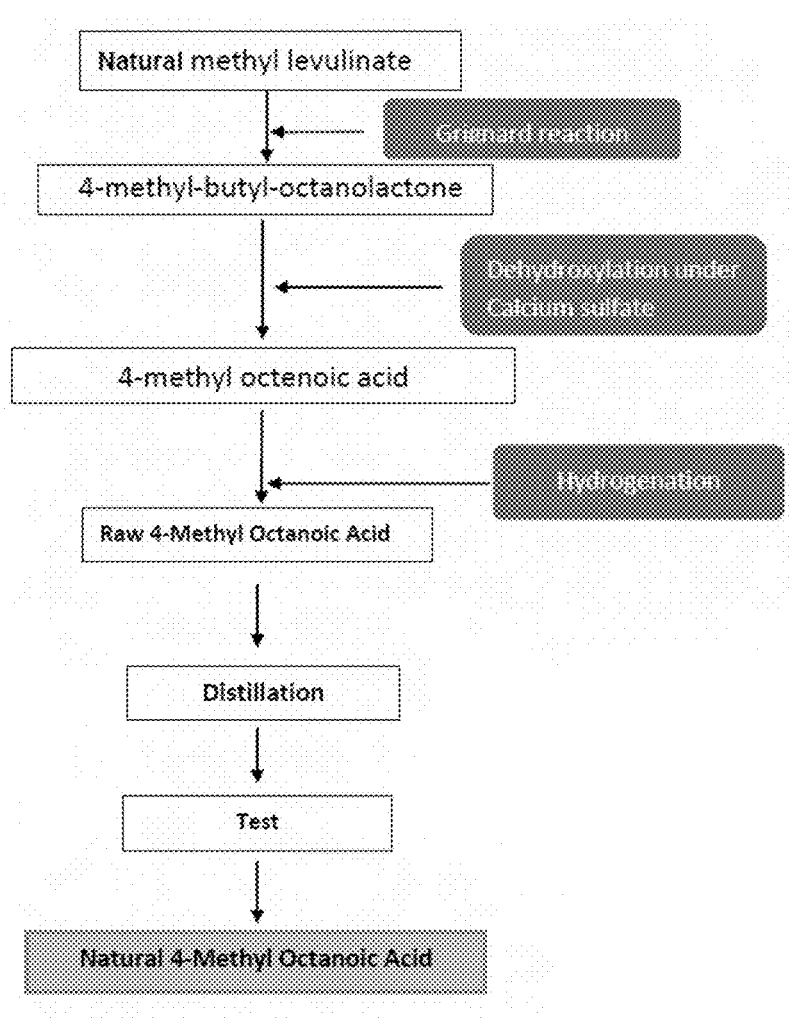
FIG. 5 is an exemplary schematic overview of the manufacturing process for 4-methyloctanoic acid.
Figure 6:
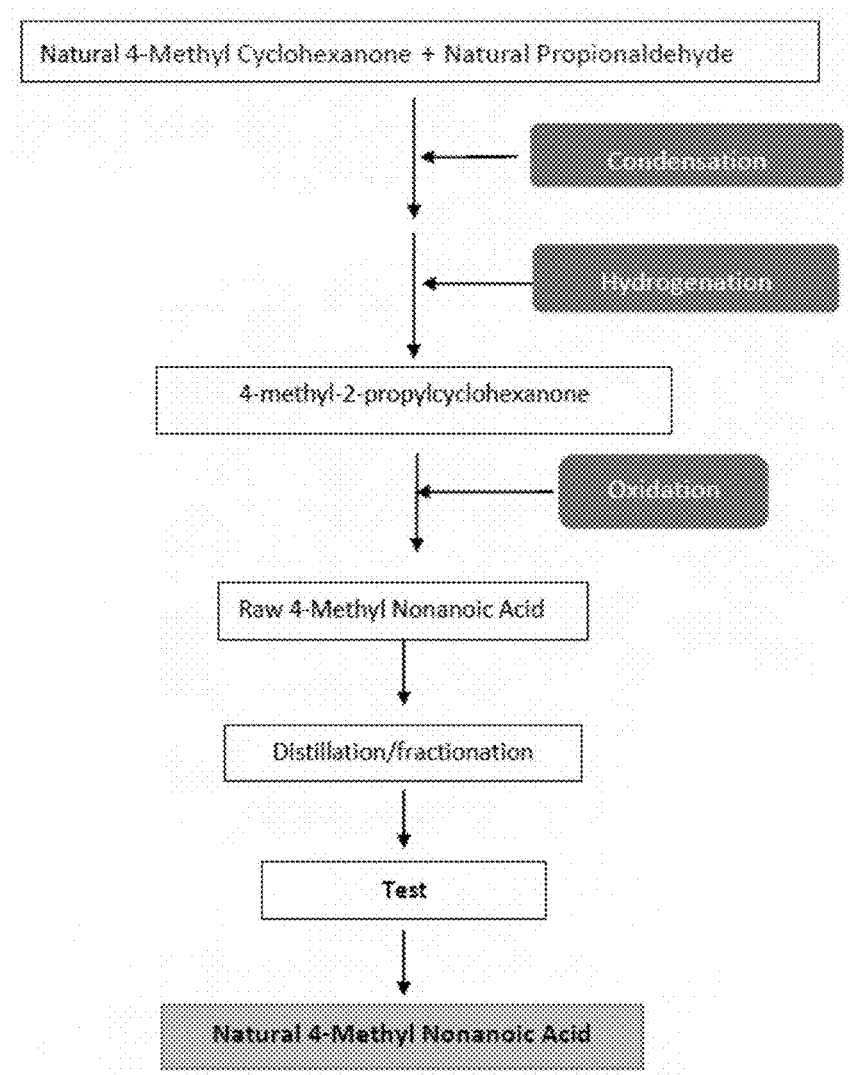
FIG. 6 is an exemplary schematic overview of the manufacturing process for 4-methylnonanoic acid.

For example, exemplary BCFAs 4-methyloctanoic acid and 4-methylnonanoic acid may be produced using natural precursors according to the pathway illustratively provided for in FIG. 5 and FIG. 6. As illustratively provided for in FIG. 5, an illustrative manufacturing process for natural 4-methyloctanoic acid may be shown. According to FIG. 5, a Grignard reaction may be carried out with natural methyl levulinate and an organo-magnesium halide to form 4-methyl-butyl-octanolactone. The intermediate 4-methyl-butyl-octanolactone then undergoes dehydroxylation with calcium sulfate to generate 4-methyloctenoic acid. The 4-methyloctenoic acid undergoes hydrogenation with a catalyst to form raw 4-methyloctanoic acid. Further distillation is performed to yield the pure, natural 4-methyloctanoic acid.

As illustratively provided for in FIG. 6, an illustrative manufacturing process for natural 4-methylnonanoic acid may be shown. According to FIG. 6, natural 4-methylcyclohexanone and natural propionaldehyde are combined and undergo a condensation reaction with alkaline condition (1% NaOH) at 10° C. for 4 hours to form the intermediate 2-allyl-4-methyl cyclohexanone. This intermediate may then be further hydrogenated to 2-methyl-4-propyl cyclohexanone. The 2-methyl-4-propyl cyclohexanone is then oxidized with a catalyst under acidic conditions at 25° C. for 2 hours and forms 4-methyl-6-oxononanoic acid. The 4-methyl-6-oxononanoic acid then undergoes decarbonylation under alkaline conditions and heat to form raw 4-methylnonanoic acid, which is further fractionated to pure, natural 4-methylnonanoic acid. Exemplary natural BCFAs may be procured from Aromiens International, Inc. of Edison, New Jersey Exemplary synthetic BCFAs, e.g., 4-ethyloctanoic acid and 2-methylhexanoic acid, may be procured from Sigma Aldrich, Inc. of St. Louis, Missouri Exemplary Embodiments of Ruminant-Flavored Plant-Based Food Products There may be numerous ways to achieve a desired ruminant sensory profile in a plant-based food product. The five factors that may be adjusted are as follows: (i) the type and concentration of BCFAs, (ii) the location of the BCFAs in the plant-based matrix, (iii) the pH of the food product, (iv) flavor precursor composition, and (v) linear FA type or concentration. It was discovered through sensory evaluations a number of preferred embodiments of ruminant sensory profiles in plant-based products.

The proper selection of BCFAs or FAs may be important to ensure an accurate ruminant sensory profile in plant-based, cell-based, and plant/cell-based hybrid products. The overarching aim of these sensory studies was to substantially emulate the flavor and aroma of lamb/goat meat and cheese products. For any ruminant meat or dairy product, gas chromatography (GC) and mass spectrophotometry (MS) may be used to identify and quantify the free FA content.

As 4-methyloctanoic, 4-methylnonanoic, and 4-ethyloctanoic acid have been recognized as potent sheep/goat flavor and aroma contributors, these were the primary BCFAs selected for testing. Several other BCFAs and FAs, including 2-methylpentanoic, 2-methylhexanoic, heptanoic, nonanoic, and demayoic acid, were also selected for testing based on their known potential contribution to fatty and cheese-like flavors. Table 3 lists these select BCFAs and FAs as well as their perceived aroma/flavor contributions when diluted in high-oleic sunflower oil.

Seven compounds were tested for impacts on aroma and flavor: 4-methyloctanoic, 4-methylnonanoic, 4-ethyloctanoic acid, 2-methylpentanoic, 2-methylhexanoic, heptanoic, nonanoic, and demayoic acid. Sensory studies were first conducted with each of the seven compounds diluted in a plant-based oil that would be later incorporated into the plant-based food product or plant-based cheese.

For aroma testing in oils, pure BCFAs or FAs (>98% purity) were diluted in high-oleic sunflower oil to the desired concentration (between the lower and upper limits) in 15 mL glass tubes with screw caps to reduce the amount of BCFAs volatilized and lost to the surroundings. The eight panelists, trained on BCFA and FA attributes, were first asked to describe both the aroma and flavor of a control oil with no added BCFAs or FAs and the aroma and flavor for the oil mixtures with added compounds.

The panelists were trained on aroma and flavor identification as described above. Oil-based samples were generated less than 10 minutes prior to testing and were assigned randomized 3-digit codes before being served. For aroma testing, only one sample was sniffed at a time with a 5-minute recovery period between each sample (there were no more than 6 samples per day). Panelists were asked to open the glass tube and sniff each sample up to 3 times before recording their responses.

For flavor testing, the panelists were asked to refrain from eating, smoking, and drinking anything except water at least an hour prior to training or evaluating sessions. As disclosed above, panelists were asked to rinse their mouths with filtered water, expectorate samples after each evaluation, and cleanse their palate with unsalted crackers after the evaluation of each sample. A 5-minute break was also imposed after each sample to minimize fatigue and errors. Panelists were allowed to use their own terms to describe the samples for both the aroma and flavor experiments.

The specific concentrations were initially chosen based on the aromatic detectability threshold noted in literature and the upper use level, which is the average maximum concentration found in food based on the Flavor and Extract Manufacturer's Association (FEMA) generally recognized as safe (GRAS) documentation. Concentrations were further narrowed down based on the most preferred sample(s) among the panelists.

The BCFAs and FAs listed in Table 3 serve as examples used by the panelists and described, though this protocol is applicable to any BCFA or FA as well other aqueous- and fat-based mediums.

TABLE 3

Select BCFA or FA flavor and aroma descriptors for dilutions in high-oleic sunflower oil

| BCFA or FA | Concentration (ppm) | Lower/upper limit (ppm) | Flavor Description | Aroma Description |
|---|---|---|---|---|
| None | 0 | — | Bland, nutty, neutral | Neutral, slightly nutty |
| 4-methyloctanoic acid | 100 | 0.02/170 | Slightly waxy and pungent, fatty, slightly lamb-like/goat-like | Waxy, sweaty, pungent, slightly goat-like/lamb-like |
| 4-methyloctanoic acid | 170 | 0.02/170 | Strong lamb, cheese-like, sweaty, pungent | Lamb-like/goat-like, nutty, musty, pungent |
| 4-methyloctanoic acid | 5 | 0.65/12 | Sweet, slightly goat-like/fatty | Sweet, slightly goat-like, fatty, musty |
| 4-methyloctanoic acid | 12 | 0.65/12 | Lamb-like, slightly sweet, fatty | Strong lamb, sweet, slightly pungent |
| 2-methylpentanoic acid | 0.5 | 0.18/0.8 | Sour, earthy, grassy, pungent | Sour, cheese-like, rancid, pungent |
| 2-methylpentanoic acid | 4 | 55.3/3 | Fatty, cheese-like, sour, slightly sweet and fruity | Sour, cheese-like, fruity |
| 4-methyloctanoic/ 4-methylnonanoic acid | 100/5 | — | Intense lamb, herbal, musty, sweaty, grassy, sweet, pungent | Herbal, musty, pungent, nutty |
| 4-methyloctanoic/ 4-methylnonanoic acid | 170/12 | — | Intense pungent/lamb-like/goat-like, chemical, fatty | Musty, lamb-like/goat-like, fatty, waxy, chemical, pungent |
| Heptanoic acid | 2 | 0.28/10 | Fruity, sweet, nutty, earthy, slightly pungent | Fruity, musty, sweaty |
| Nonanoic acid | 6 | 2.4/15 | Grassy, nutty, creamy, sweet, cheese-like | Cheese-like, fatty, dairy, musty |
| Demayoic acid | 10 | 1.7/2,000 | Fatty/creamy, gamy, pungent | Slightly pungent, cheese-like, sour |

Based on the panelists' aromatic and flavor descriptors for the two natural BCFAs, panelists noted that the two natural BCFAs, 4-methyloctanoic acid and 4-methylnonanoic acid, had a synergistic effect on the flavor and aroma of the product. Specifically, panelists described the product as having a more balanced aromatic and flavor profile reminiscent of fatty lamb or goat when the two naturally synthesized BCFAs were combined.

BCFAs or FAs found in animal meat or dairy products were added to BSF burgers to determine if they imparted the desired ruminant aroma and flavor attributes. Based on the results of the sensory evaluations conducted on the BSF burgers in Table 3, two natural BCFAs from Aromiens, 4-methyloctanoic acid and 4-methylnonanoic acid, were the focus of next experiments. While 4-methyloctanoic acid and 4-methylnonanoic acid were identified as per the above protocol and synergies in their combination found, it is contemplated that the same protocol may be applied to these and any other BCFAs in two, three, or any other multiple combinations to determine synergistic effects in enhancing the sensory profile of a plant-based food product.

In an exemplary embodiment, any two or more of the following BCFAs, naturally or synthetically produced, may be synergistically combined to create ruminant meat sensory profiles in plant-based food products: 2-methylbutanoic acid, 3-methylbutanoic acid, 2-methylpentanoic acid, 3-methylpentanoic acid, 4-methylpentanoic acid, 2-methylhexanoic acid, 4-methylhexanoic acid, 2-ethylhexanoic acid, 2-methylheptanoic acid, 4-methylheptanoic acid, 5-methylheptanoic acid, 6-methylheptanoic acid, 4-ethylheptanoic acid, 4-methyl octanoic acid, 6-methyloctanoic acid, 2,2-dimethyloctanoic acid, 3,6-dimethyloctanoic acid, 3,6-dimethyloctanoic acid, 4-ethyloctanoic acid, 4-methylnonanoic acid, 2-methylnonanoic acid, 8-methylnonanoic acid, 2,2-dimethylnonanoic acid, 3,6-dimethylnonanoic acid, 2-ethyldemayoic acid, 2-methydemayoic acid, 3-methyldemayoic acid, 4-methyldemayoic acid, 8-methyldemayoic acid, 9-methyldemayoic acid, 2,2-dimethyldemayoic acid, 2,5-dimethyldemayoic acid, 3,5-dimethyldemayoic acid, 11-methyltridemayoic acid, 12-methyltridemayoic acid, 10-methyltetrademayoic acid, 11-methyltetrademayoic acid, 12-methyltetrademayoic acid, 13-methyltetrademayoic acid, 14-methylpentademayoic acid, 15-methylhexademayoic acid, 14-methylhexademayoic acid, 16-methylheptademayoic acid, 17-methyloctademayoic acid, 18-methylnonademayoic acid, 12-methyleicosanoic acid, and 18-methyleicosanoic acid.

Figure 7A:
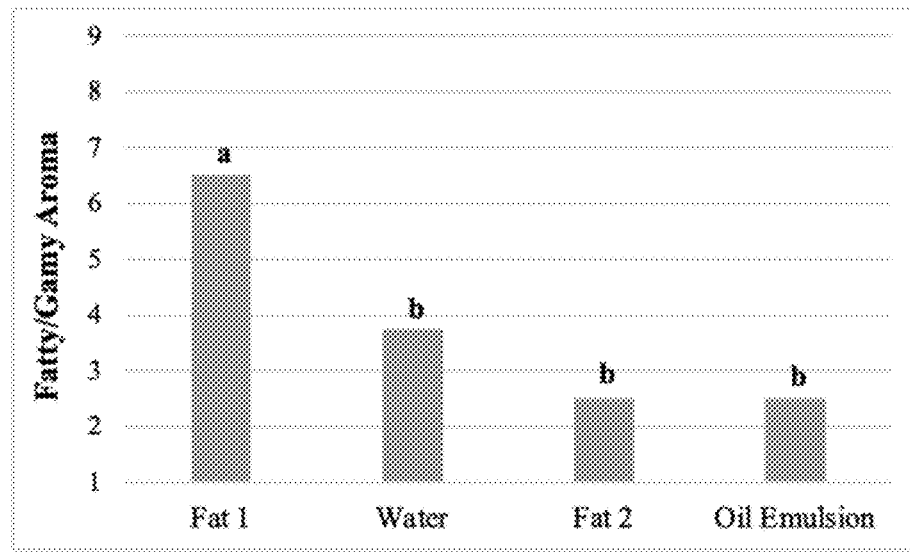
FIGS. 7A-B are exemplary graphical representations of intensities of the fatty/gamey aroma and flavor of plant-based food products when BCFAs are added in different stages of production of the underlying plant-based food product.
Figure 7B:
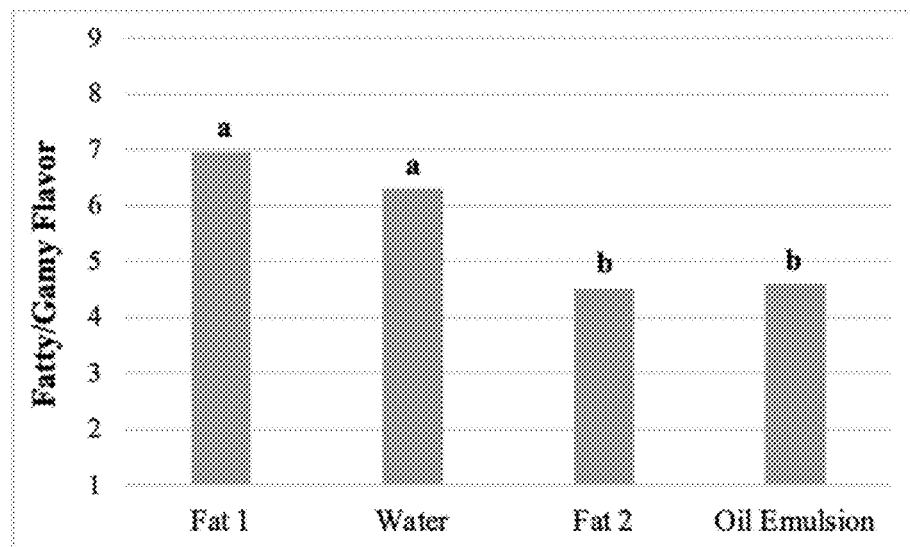

With reference to FIG. 7A and FIG. 7B, two natural BCFAs were added in fixed concentrations to different phases of a plant-based food product ("BSF Burger") during its preparation. For burgers containing BCFAs and/or FAs, these compounds are added into either the plant-based oil in the emulsion, the aqueous phase with the amino acids, or the structured fats. The same protocol that applied to the aroma and flavor sensory panel described with respect to the ruminant meat and plant-based alternatives testing graphed in FIG. 1 above was used in determining the results graphed in FIG. 7A and FIG. 7B.

The intensities of the fatty/gamey aroma and flavor in FIGS. 7A-B are different from those discussed with respect to FIG. 1 because the panelists were making comparisons among the four different BCFA locations in the BSF Burger. Panelists were asked to score the fatty/gamey notes based on: 1-Not Detectable, 3-Slight, 5-Moderate, 7-Strong, 9-Intense. They were allowed to use the other scores on the scale, 1 to 9, based on the intensity of this attribute. They were also asked to describe the products with related terms to describe the aroma notes.

The BSF Burger of FIG. 7A and FIG. 7B was composed of texturized pea protein, an oil-in-water emulsion, and structured fats. The oil-in-water emulsion is 15-20 wt % plant-based oil, 70-79 wt % water, <7 wt % natural flavors and colorants, and <3 wt % methylcellulose, which stabilizes the emulsion. The aqueous phase of this emulsion contains a mixture of amino acids, colorants, acids, and salts (i.e., flavor precursors previously described). The combination of the aqueous and oil-rich phases of the emulsion is added and mixed into the hydrated texturized pea protein at a ratio of 1.5-2:1. Structured fats are then added to this mixture to enhance the mouthfeel and/or provide rendering during the cooking of the plant-based meat analogue. A structured fat could be an emulsion, a fat with added carbohydrates, such as those previously described, or a pure, solidified fat in granular form. Exemplary plant-based fats include cocoa butter, coconut oil, sunflower oil, safflower oil, and mayola oil.

As illustrated in FIG. 7A and FIG. 7B, introduction of two natural BCFAs (4-methyloctanoic acid and 4-methylnonanoic acid) during the step when incorporating the mouthfeel fat to the BSF Burger (step "Fat 1") resulted in the panelists finding the most intense fatty/gamy aroma and flavor. Introduction of the same BCFAs into the aqueous phase of the emulsion (water phase) during the step it was introduced in the preparation of the BSF Burger (step "Water") resulted in the panelists finding the second highest intensity for fatty/gamy aroma and flavor. Introduction of the natural BCFAs during the step when incorporating the rendered fat to the BSF Burger (step "Fat 2") resulted in the panelists finding the third most intense fatty/gamy aroma and flavor. Introduction of the natural BCFAs during the step when incorporating the fat phase of the emulsion to the BSF Burger (step "Oil Emulsion") resulted in the panelists finding the least intense fatty/gamy aroma and flavor.

According to FIG. 7A and FIG. 7B, there were reported only slight differences in the intensity of the fatty/gamey aroma for BCFAs added in the oil phase, water phase, or structured fat 2. The intensity of a fatty/gamey aroma significantly increased when BCFAs were added to the structured fat 1 as compared to the other three locations. The significance of structured fat 1 with respect to BSF Burger preparation was that it was the only phase that did not contain a mixture of other compounds, i.e., it was comprised almost entirely of a pure plant-based fat with added BCFAs.

From the results tabulated in FIG. 7A and FIG. 7B, the sequence of BCFA introduction to a plant-based food product evidence that the timing of introduction into and location within the BSF Burger matrix of BCFAs contributes to the meaty/gamy aroma and flavor attribute of the resulting ruminant flavored plant-based food product.

When the BCFAs were added to the oil phase of the emulsion, panelists noted that the flavor of the BSF burger was smoother and more balanced, yet the intensity of the fatty/gamey flavor was higher for the burger with the BCFAs added to the water phase. These results could be due to the partitioning behavior of the BCFAs and the nature of the oil-in-water emulsion. The intensity of the gamey flavor was the highest when the BCFAs were added to structured fat 1. This result is in accordance with the intensity of the aroma in the previous section. However, this flavor intensity was not significantly different from the burger with the BCFAs in the water. The gaminess significantly decreased when the compounds were incorporated into structured fat 2 or the oil phase of the emulsion. These two locations resulted in a very similar fatty/gamey flavor. Overall, altering the location of the BCFAs in a plant-based food product modulates the intensity of a fatty/gamey flavor and aroma such that varying BCFA location may create different sensory profiles in plant-based products designed to substantially emulate ruminant meats.

Figure 8:
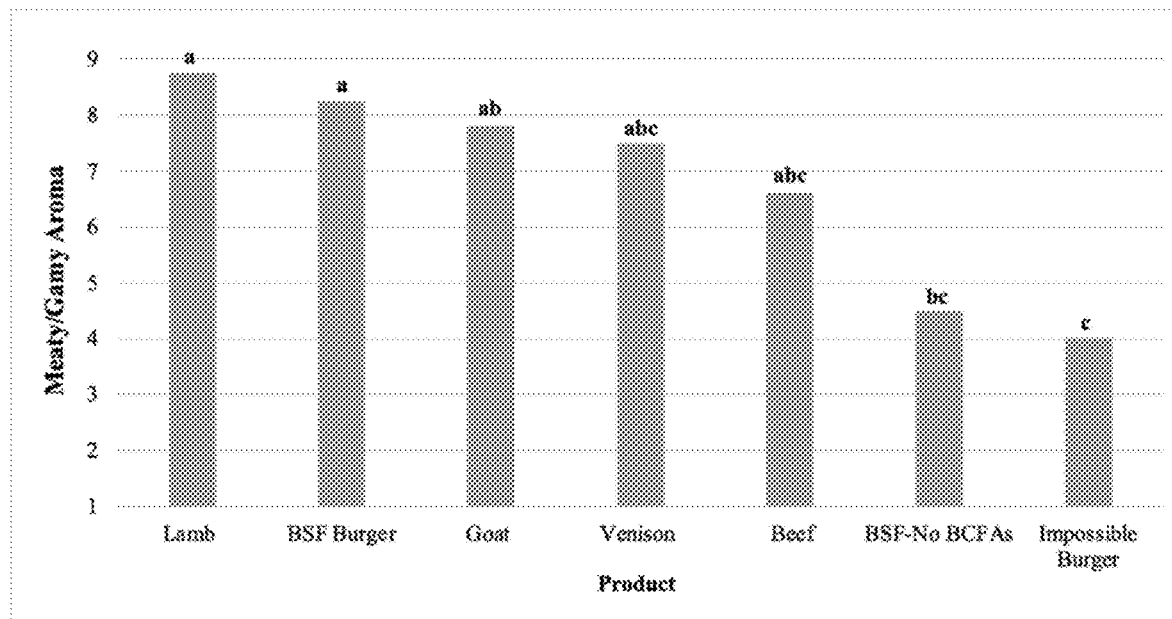
FIG. 8 is an exemplary graphical representation of intensities of meaty/gamey aroma in select ruminant meats and plant-based ruminant meat alternatives.

With reference to FIG. 8, the intensity of the meaty/gamey aroma significantly increased when 170 ppm of 4-methyloctanoic acid and 12 ppm of 4-methylnonanoic acid were added to BSF burgers. As used in FIG. 8, the different letters above each of the bars in the graph indicate significant differences of meaty or gamey aroma among products at a p-value of less than or equal to 0.05. For example, the gaminess in the BSF burger with BCFAs was not significantly different from the gaminess in pan-seared lamb. In contrast, a BSF burger lacking BCFAs had a gaminess intensity closer to that of beef and an Impossible® burger.

Figure 9:
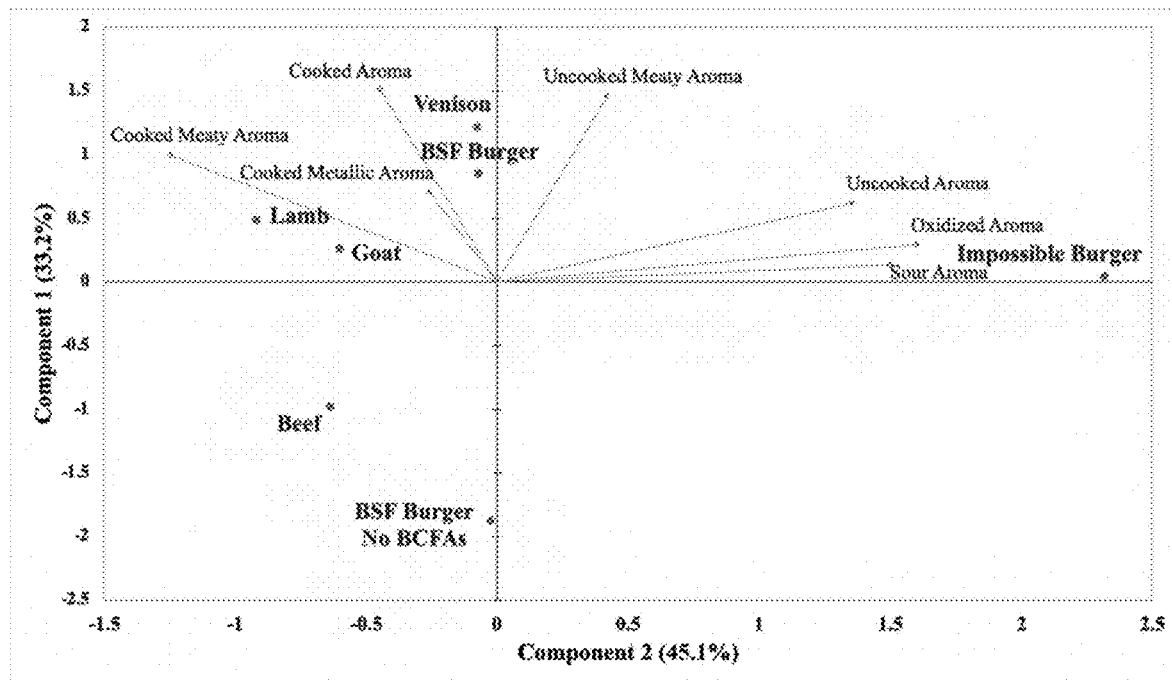
FIG. 9 is an exemplary graph showing Principal Component Analysis of the aroma attributes in select ruminant and plant-based meats.

FIG. 9 represents a principal component analysis (PCA) plot of the results graphed in FIG. 8. PCA Plot Component I is described as the overall uncooked aroma, cooked meaty/ gamey aroma, cooked oxidized aroma, and sour aroma, while component II is described as the overall cooked and uncooked meaty aroma. In an exemplary embodiment, the variance observed in FIG. 9 was 45.1% attributable to Component I and 33.2% attributable to Component II. The PCA plot of FIG. 9 illustrates how the presence of the BCFAs in BSF burgers changed the intensity of the aromatics in the same direction as lamb and goat and how the key attributes such as cooked meaty aroma are negatively correlated with the burger with no BCFAs.

Figure 10:
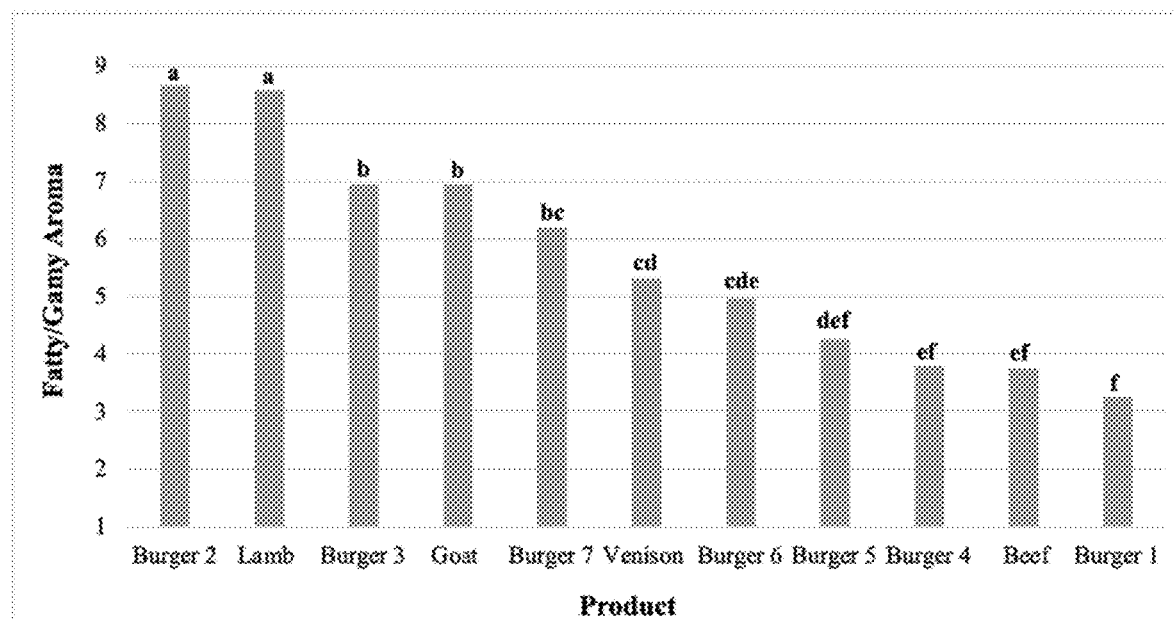
FIG. 10 is an exemplary graphical representation of intensities of fatty/gamey aroma in ruminant meats and plant-based meats with different concentrations and types of BCFAs.

With reference to FIG. 10, panelists were asked to score the fatty/gamey aroma based on the same 9-point intensity scale previously described as applied to numerous burgers with BCFAs, controls, and commercially available plant-based food products. Fresh ground beef and lamb meats were purchased from a local supermarket (Gus's Community Market; 2111 Harrison St, San Francisco, CA 94110, U.S.A). The lamb meat was sourced from Anderson Ranches in Brownsville, OR, where the lambs are 100% grass-fed, graze on open pastures, and slaughtered between 10 and 12 months of age The beef was sourced from Niman Ranches, a network of small family farms scattered across the Midwestern and Western U.S., where the cows are finished on grain, graze on open pastures, and slaughtered when they reach approximately 36 months. Fresh ground goat meat was purchased from a local supermarket (Salama Halal Meat; 604 Geary St, San Francisco, CA 94102, U.S.A). The goat meat was sourced from Superior Farms in Sacramento, CA, where the goats are slaughtered between the ages of 6-8 months. Grass-fed ground venison was purchased frozen from The Honest Bison (Cadott, Wisconsin, U.S.A). The deer from which the venison is sourced are slaughtered between 24-36 months old in the honest bison grasslands in Wisconsin. The Beyond burger® (Beyond Meat®; El Segundo, CA, U.S.A), Impossible® burger (Impossible® Foods; Redwood City, CA, U.S.A), Boca® burger (Boca burger; Chicago, IL, U.S.A) and Lightlife® burger (Lightlife®; Braintree, MA, U.S.A) were also purchased from Gus's Community Market and allowed to thaw 4-6 hours in the refrigerator prior to use. BSF burger samples were made one day prior to testing, frozen overnight, and were thawed the next day for 4-6 hours in the refrigerator. The 113 g patties of each sample were seared for 6 minutes (3 minutes on each side) at approximately 400° F. in a non-stick skillet.

As shown in FIG. 10, the burgers labeled Burger 1, Burger 2, Burger 3, Burger 4, Burger 5, Burger 6, and Burger 7 correspond to the same plant-based food product but with differing BCFA concentrations, which are provided for in the below Table 4.

TABLE 4

Figure 11:
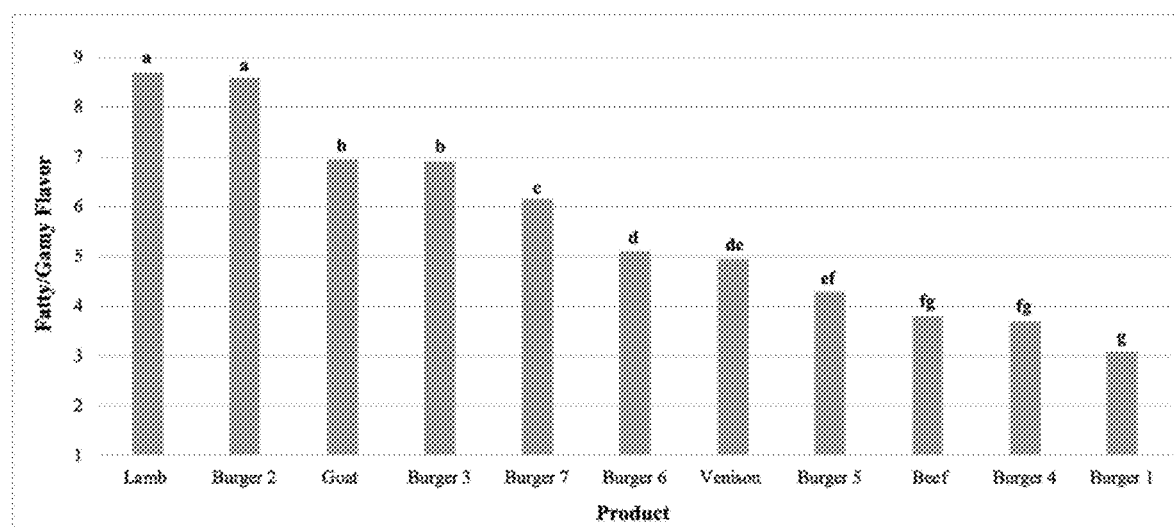
FIG. 11 is an exemplary graphical representation of intensities o of fatty/gamey flavor in ruminant meats and plant-based meats with various concentrations and types of BCFAs.

Branched Chain Fatty Acid concentrations used in the plant-based burgers for FIGS. 10 and 11

| Product | BCFAs | BCFA Concentration per product (ppm) |
| --- | --- | --- |
| Burger 1 | CONTROL | 0 |
| Burger 2 | 4-Methyloctanoic Acid: 4-Methylnonanoic Acid | 170/12 |
| Burger 3 | 4-Methyloctanoic Acid: 4-Methylnonanoic Acid | 80/5 |
| Burger 4 | 4-Methyloctanoic Acid: 4-Methylnonanoic Acid | 0/3 |
| Burger 5 | 2-Methylhexanoic | 4 |
| Burger 6 | 4-Ethyloctanoic | 10 |
| Burger 7 | 4-Methyloctanoic Acid: 4-Methylnonanoic Acid | 12/170 |

As used in FIG. 10, the different letters above each of the bars in the graph indicate significant differences of fatty/gamey aroma among products at a p-value of less than or equal to 0.1.

As illustratively provided for in FIG. 10, when the ratio of 4-methyloctanoic acid to 4-methylnonanoic acid was reduced from 170:12 ppm to 80:5 ppm, the intensity of gamey aroma decreased and was not found to be significantly different from the goat product. Additionally, when the ratio of concentrations of 4-methyloctanoic acid to 4-methylnonanoic acid were reversed (compare Burger 2 to Burger 7), the fatty aroma intensity decreased causing the final product to substantially emulate an aroma closer to the goat and venison aromas.

FIG. 10 also illustratively provides for bases for comparison to natural ruminant meat products. For example, the venison burger had different fatty/gamy aromas as compared to lamb and goat. The aroma of this sample was described as rich, earthy, and wild. The intensity of the fatty/gamey aroma of venison was not statistically different from burgers 5 or 6. However, burger 5, which contained 4 ppm of 2-methylhexanoic acid, was described as having acidic, oily/fatty, and roasted fatty notes. Burger 6 contained 10 ppm of 4-ethyloctanoic acid, which produced more meaty notes than gamey ones. The background flavor from burger 4 with a low concentration of 4-methylnonanoic acid of 3 ppm induced meaty notes. The intensity of a gamey aroma in burger 4 was not significantly different from the beef burger. Burger 1, with no added BCFAs, showed the lowest intensity of a fatty/gamey aroma, but it was not significantly different from the beef burger or burger 4.

As illustratively provided for in FIG. 10, addition of BCFAs to a plant-based food product altered the aroma profile to be like that of the ruminant animals they were meant to substantially emulate. In an exemplary embodiment, a plant-based food product into which a ratio of 170:12 ppm of two natural BCFAs was introduced was found to possess attributes, in this case fatty/gamy aroma, that was like that of natural lamb. In an exemplary embodiment, a plant-based food product into which a ratio of 80:5 ppm of a combination of natural BCFAs was introduced was found to possess attributes, in this case fatty/gamy aroma, that was like that of natural goat. In yet another exemplary embodiment, a plant-based food product possessing a ratio that was the reverse of the ratio of the combination of natural BCFAs that substantially emulated the fatty/gamy aroma of natural lamb produced an attribute, in this case fatty/gamy aroma, that was like that of natural venison. In still another embodiment, a plant-based food product into which a synthetic BCFA was introduced was found to possess attributes, in this case fatty/gamy aroma, that was like that of beef In another embodiment, plant-based food products comprised of a combination of natural BCFAs had more intense ruminant aroma attributes as compared to plant-based food products with only one natural BCFA or a synthetically derived BCFA. In a still further embodiment, plant-based food products comprised of higher concentrations of natural BCFAs had more intense ruminant aroma attributes as compared to plant-based food products with lesser natural BCFA concentrations.

With reference to FIG. 11, panelists were trained with the flavor attributes related to the BCFA compounds to describe and evaluate the intensity of a fatty/gamey flavor in animal meats and plant-based meats with added BCFAs. The gamey/fatty attribute was the attribute most affected by BCFAs. Therefore, this attribute was selected to show the impact of different concentrations/types of BCFAs on the various burgers. The same protocol that applied to the aroma testing was used here, except after three burgers, each panelist was asked to eat unsalted crackers and sip water during their 5-minute break to cleanse their palate.

As used in FIG. 11, the different letters above each of the bars in the graph indicate significant differences of fatty/gamey aroma among products at a p-value of less than or equal to 0.1. As illustratively provided for in FIG. 11, the same ruminant flavored plant-based food products that created the fatty/gamy aromas closely resembling lamb and goat, Burgers 2 and 3, respectively, were also the same food products that created the fatty/gamy flavors closely resembling lamb and goat, respectively. The venison flavor was achieved by two different types of inventive burgers: Burger 6, which used a synthetically derived BCFA, and Burger 7, which comprised the inverse of the natural BCFA ratio of Burger 2. Once again, plant-based food products that comprised either synthetically derived BCFAs or only one natural BCFA had less intense ruminant flavors as compared to those with a combination of natural BCFAs.

As further illustrated in FIG. 11, burger 2 was the most gamey/fatty burger among the six plant-based burgers due to its higher concentration of BCFAs, 170 ppm of 4-methyloctanoic acid and 12 ppm of 4-methylnonanoic acid. The intensity of gaminess in this sample was not significantly different from lamb. When the concentration of 4-methyloctanoic acid was reduced to 80 ppm and 4-methylnonanoic acid to 5 ppm in burger 3, the gamey/fatty flavor decreased by a statistically significant margin and was not significantly different from the goat burger. Interestingly, when the ratio of the concentrations of 4-methyloctanoic acid to 4-methylnonanoic acid in burger 2 were reversed in Burger 7, the intensity of gaminess significantly decreased. Panelists described this burger as tasting creamy, goat-like, and earthy.

The intensity of a fatty/gamey flavor in the venison burger was not significantly different from burger 5 or 6. However, venison was found to have different flavor notes. The flavor was described as earthy, wild, rich, and fruity. A total of 4 ppm of 2-methylhexanoic was added to burger 5, which was described as having fatty/oily, creamy, and dairy notes. Burger 6 was significantly less gamey/fatty than lamb or goat. However, a low concentration of 4-ethyloctanoic, 10 ppm, was still able to produce a gamey flavor in burger 6. Burger 4, which contained only 3 ppm of 4-methylnonanoic acid, was the most similar plant-based burger to the beef burger. Although there were no significant differences between the beef burger and Burger 1, which had no added BCFAs, panelists found Burger 4 to be meatier with animal-like notes.

As illustratively provided for in FIG. 11, addition of BCFAs to a plant-based food product altered the flavor profile to be like that of the ruminant animals they were meant to substantially emulate. In an exemplary embodiment, a plant-based food product into which a ratio of 170:12 ppm of two natural BCFAs was introduced was found to possess attributes, in this case fatty/gamy flavor, that was like that of natural lamb. In an exemplary embodiment, a plant-based food product into which a ratio of 80:5 ppm of a combination of natural BCFAs was introduced was found to possess attributes, in this case fatty/gamy flavor, that was like that of natural goat. In yet another exemplary embodiment, a plant-based food product possessing a ratio that was the reverse of the ratio of the combination of natural BCFAs that substantially emulated the fatty/gamy flavor of natural lamb produced an attribute, in this case fatty/gamy flavor, that was more intense than that of natural venison. In still another embodiment, a plant-based food product into which a synthetic BCFA was introduced was found to possess attributes, in this case fatty/gamy flavor, that was like that of venison. In another embodiment, plant-based food products comprised of a combination of natural BCFAs had more intense ruminant flavor attributes as compared to plant-based food products with only one natural BCFA or a synthetically derived BCFA. In a still further embodiment, plant-based food products comprised of higher concentrations of natural BCFAs had more intense ruminant flavor attributes as compared to plant-based food products with lesser natural BCFA concentrations.

Figure 12A:
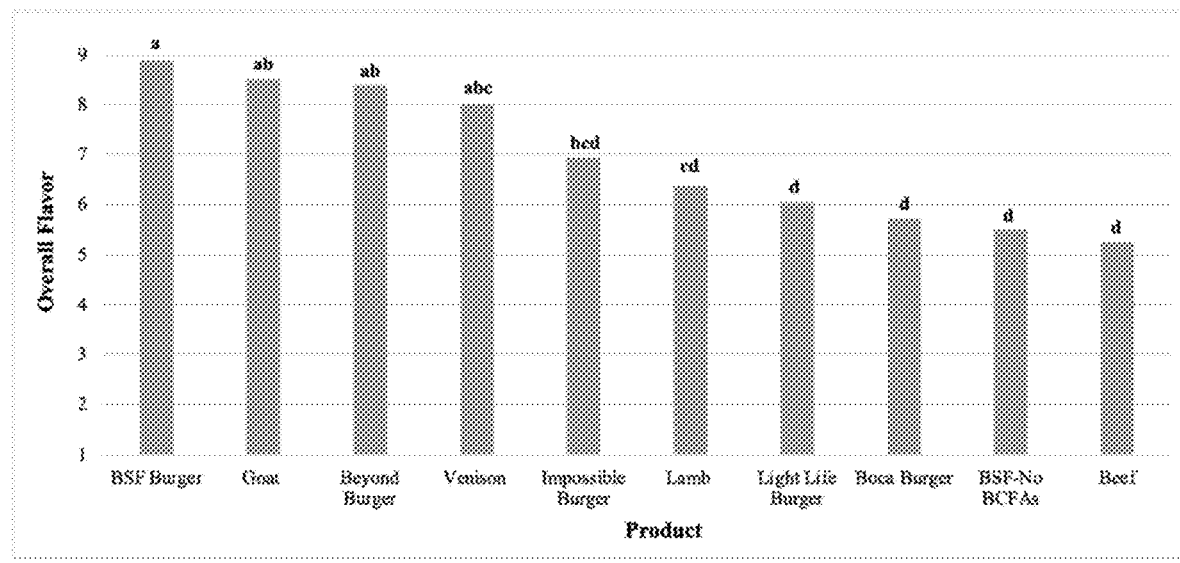
FIGS. 12A-D are exemplary graphical representations of intensities of flavor attributes (e.g., overall flavor, meaty/gamey flavor, fatty flavor, and overall balance) in select ruminant and plant-based meats.
Figure 12B:
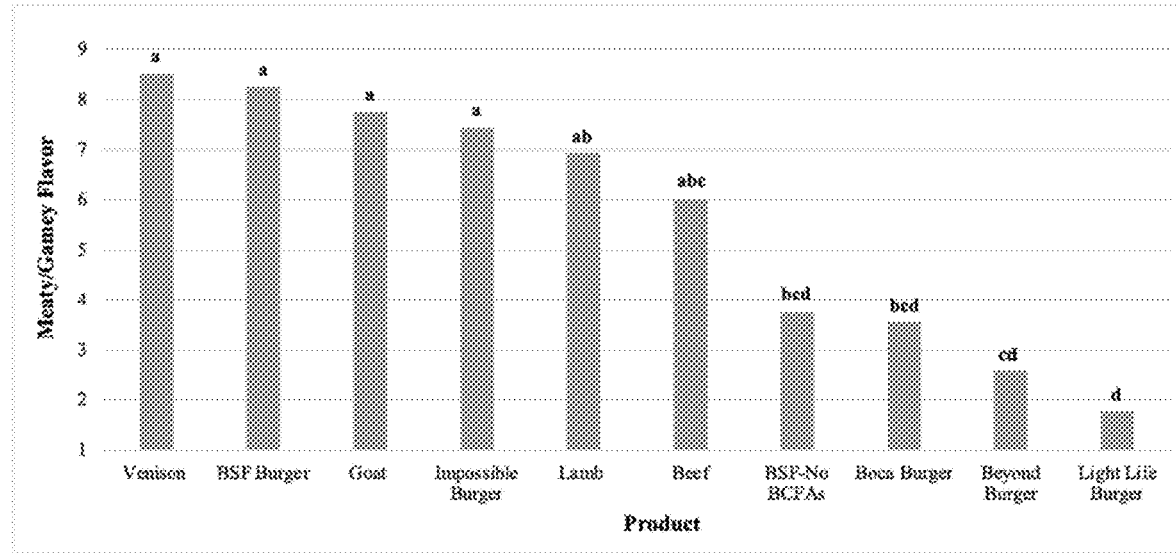
Figure 12C:
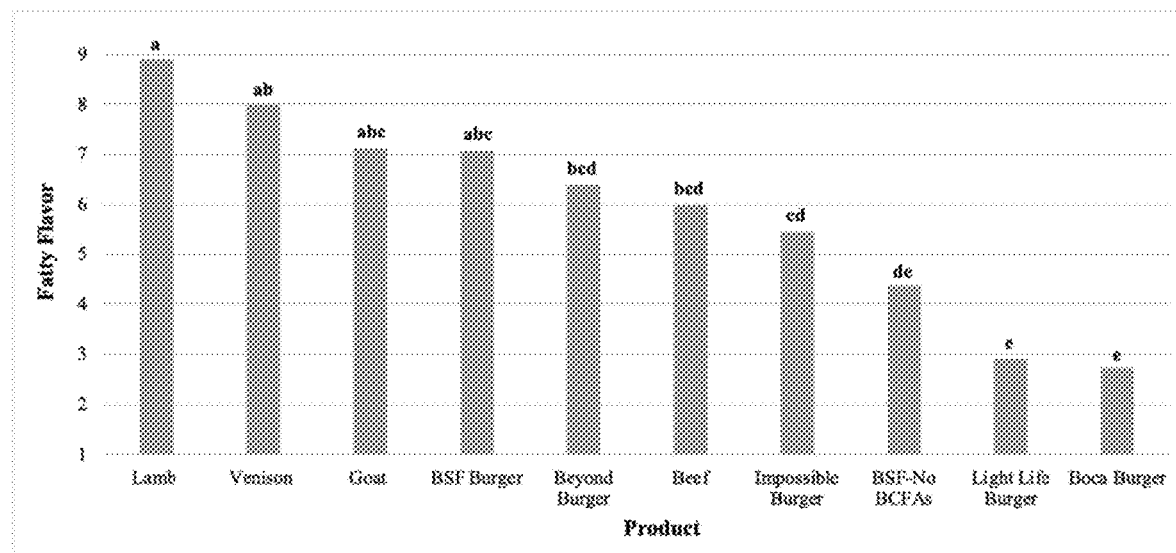
Figure 12D:
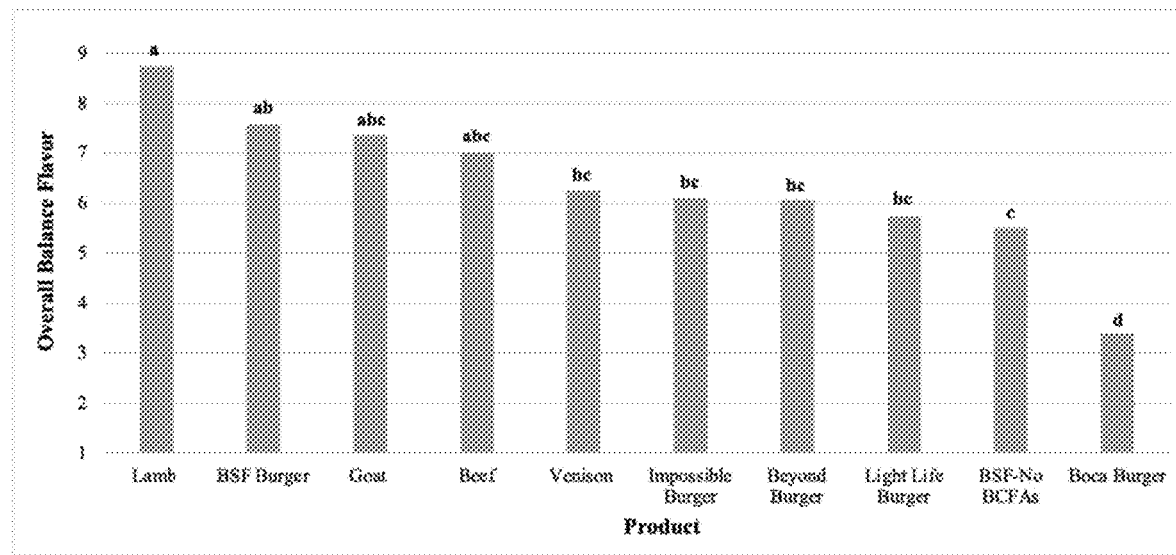

The sensory protocol previously identified with respect to FIGS. 1 and 7 was applied to numerous ruminant and plant-based alternative products as well as inventive plant-based food products in FIGS. 12A-D to assess sensory profile attributes, including overall flavor, meaty/gamey flavor, fatty flavor, and overall balance flavor. With reference to FIG. 12A, FIG. 12B, FIG. 12C and FIG. 12D, different letters above each of the bars in the graphs illustrated therein indicate significant differences in the graphically represented flavor attribute at a p-value of less than or equal to 0.05. For example, the BSF burger with BCFAs had noted increases in overall flavor (FIG. 12A), meatiness (gaminess) (FIG. 12B), fattiness (FIG. 12C), and overall balance (FIG. 12D). A total of eighteen flavor attributes were used to determine differences among the products, with the addition of BCFAs to the BSF burgers showing a significant increase in the intensity of the flavor attributes. For BSF Burger with BCFAs, 4-methyloctanoic acid and 4-methylnonanoic acid were incorporated into the oil-rich phase of the emulsion to achieve a final concentration in the burger of 170 ppm and 12 ppm, respectively. These compounds significantly increased the overall flavor, meatiness (gaminess), fattiness, and overall balance of the BCFA infused plant-based product.

It was found that the BCFAs increased grassy, metallic, umami, and sweet flavor notes and minimized vegetal notes, which are known to detract from the ruminant animal flavor in food products. As illustrated in FIG. 12A, FIG. 12B, FIG. 12C and FIG. 12D, the gaminess, fattiness, and overall balance (the roundness of flavor) of BSF burgers with BCFAs were not significantly different from lamb, goat, and venison. The BCFAs in the BSF burgers showed gamey notes more associated with non-beef ruminant animals (such as lamb, goat, and venison), which differed from the meaty notes found in beef and its analogues, such as Impossible®, Light Life®, Boca®, and Beyond® burgers.

The graphs illustrated in FIG. 12A, FIG. 12B, FIG. 12C and FIG. 12D provide an example of the benefits of BCFAs in plant-based food products. As shown, the use of BCFAs in the BSF burger improved grassy, metallic, umami, and sweet flavor notes and minimized undesirable vegetal notes.

Figure 13:
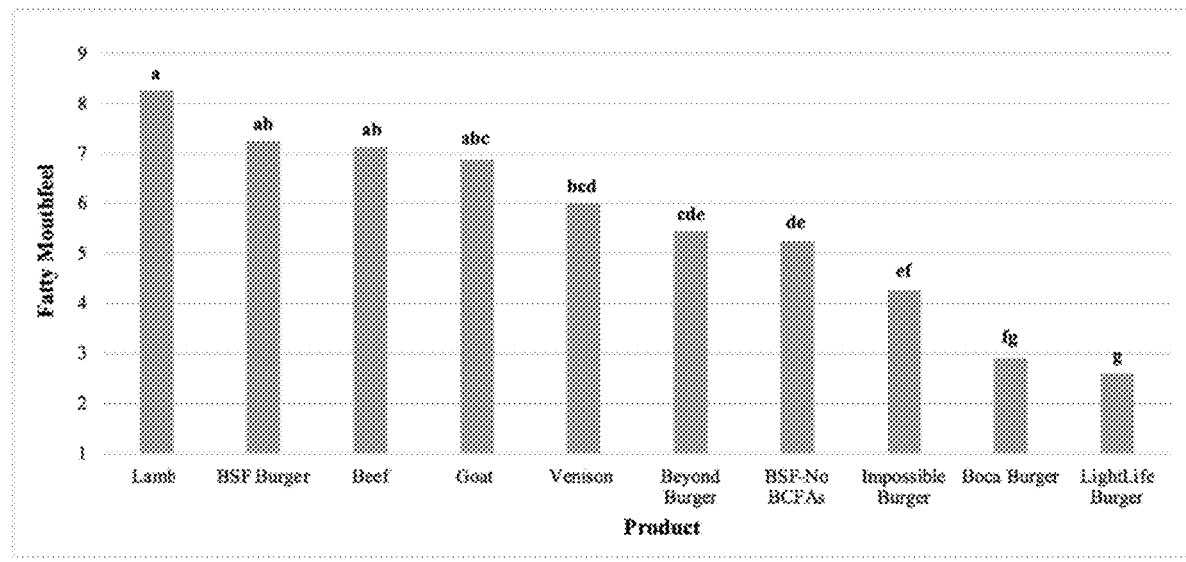
FIG. 13 is an exemplary graphical representation of intensities of the fatty mouthfeel in select ruminant and plant-based meats.

With reference to FIG. 13 and using the same sensory protocol previously described with respect to FIGS. 1, 7, and 12A-D, the fatty mouthfeel of six plant-based burgers including BSF burgers with and without addition of BCFAs; Beyond burger®; Impossible® burger; Boca® burger; Lighlife burger®; and four animal meat burgers including lamb, goat, beef, and venison were evaluated. Surprisingly, the addition of just two BCFAs in the aforementioned proportions significantly increased the perception of a fatty mouthfeel from a BSF Burger without BCFAs. Further surprisingly, the addition of just two BCFAs in the aforementioned proportions also allowed the BSF Burger to attain a fatty mouthfeel of the same intensity as that of a beef burger and far beyond other plant-based beef analogues, such as the Beyond Burger®, Impossible® Burger, Boca® Burger, and the LightLife® Burger. With reference to FIG. 13, different letters above each of the bars in the graphs illustrated therein indicate significant differences in the graphically represented sensory attribute (in this case fatty mouthfeel) at a p-value of less than or equal to 0.05.

Thus, the addition of BCFAs in a plant-based food product may provide the advantage of substantially emulating the mouthfeel of beef products without reliance on prior art flavor precursors and/or heme while simultaneously achieving notes associated with other ruminant animals, such as lamb, goat, or venison. In an exemplary embodiment, the addition of BCFAs in a plant-based food product creates an overall more intense ruminant animal aroma and flavor profile as compared to prior art beef-ruminant plant-based analogues and the natural ruminant animal products they were meant to substantially emulate, such as, beef, goat, or venison as illustratively provided for in FIG. 12D.

Figure 14:
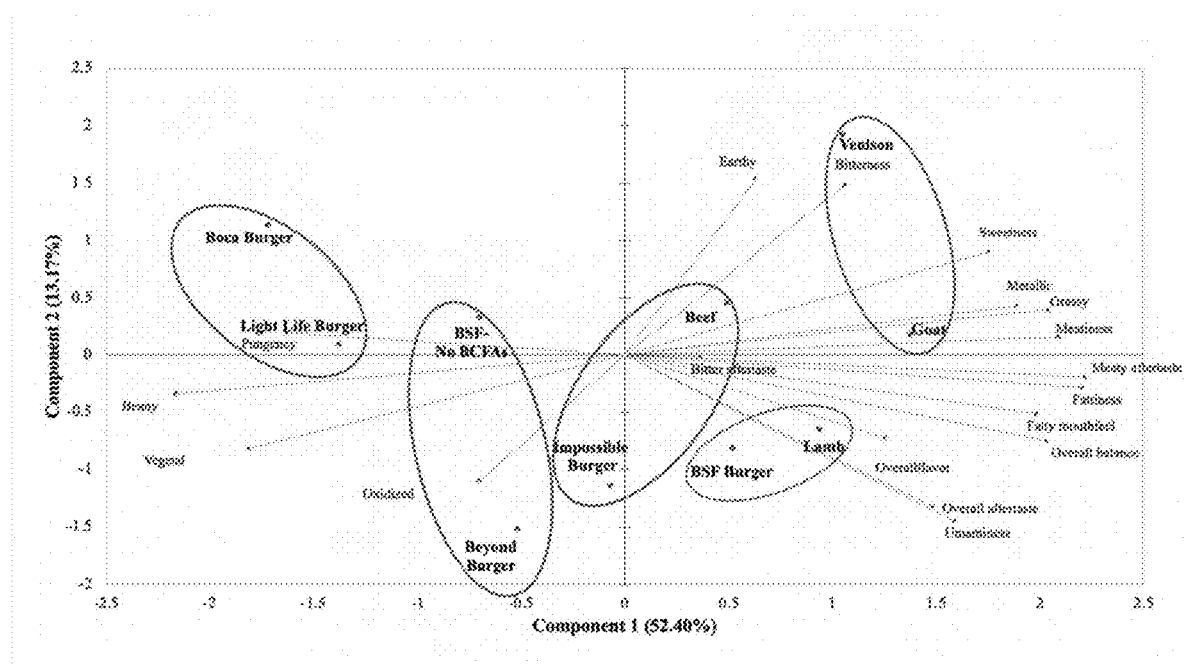
FIG. 14 is an exemplary graph showing Principal Component Analysis of flavor and mouthfeel attributes of select ruminant and plant-based meats grouped by Agglomerated Hierarchical Cluster Analysis.

FIG. 14 provides another PCA plot of the food products of FIGS. 12A-D and 13 and an agglomerated hierarchical cluster (AHC) analysis of the food products by flavor attribute scores. The PCA plot of FIG. 14 comprises two components. Component I is described as being positively correlated to fatty, meaty/gamey, grassy, sweet, umami, metallic flavors as well as overall flavor, overall balance, and meaty/gamey aftertaste. Component I is described as being negatively correlated to vegetal, beany, and pungency flavors. Component II is described as being positively correlated to bitter and earthy flavors and negatively correlated to oxidized flavors. In an exemplary embodiment, the variance observed in FIG. 14 was 52.4% attributable to Component I and 13.17% attributable to Component II.

As depicted in FIG. 14, the AHC analysis divided the food products into two classes and five sub-clusters. The first class comprised: lamb, BSF burger with BCFAs, Impossible® burger, beef, goat, and venison. The second class comprised a BSF burger without BCFAs, Beyond burger®, Lightlife® burger, and Boca® burger. The only plant-based food products in class I were the BSF burger with BCFAs and the Impossible® burger. The BCFA content of the BSF burger distinguished it from the other plant-based food products in class 2, which exhibited higher intensity in flavors associated with beany or vegetal tastes.

As indicated in FIG. 14, the introduction of BCFAs in the BSF burger allowed this plant-based food product to exhibit the flavors and food qualifies most closely associated with lamb. In contrast, the Impossible® burger was more closely associated with the flavors and food qualities most closely associated with beef, which is a consequence of the product's incorporation of home, as opposed to BCFAs.

The inventors further discovered that the inclusion of BCFAs did not significantly affect the appearance or textural attributes of any BSF burgers. Thus, the inclusion of BCFAs may positively enhance the aroma, flavor, and mouthfeel of the plant-based food without any resulting negative effects in terms of texture or appearance.

Effects of pH on BCFA-Infused Plant-Based Food Products

The pH of the component of the plant-based food product into which the BCFAs are introduced may also play a role in the ruminant flavor profile for the plant-based food product. As the pH is altered, the threshold of detectability for the BCFAs is expected to change, and thus, perceived flavors and aromas are also expected to change. BSF burgers were prepared with 170 ppm 4-methyloctanoic acid and 12 ppm 4-methylnonanoic acid, which were added to the oil-rich phase of the emulsion. The pH of the aqueous phase was adjusted to 5.2, 5.4, 5.6, 5.8, or 6.0 prior to cooking. Panelists were asked to describe flavor notes for the final, cooked product to evaluate whether or not a balanced, gamey profile could be achieved through a change in pH.

The effect of the aqueous phase pH on the flavor notes of the BSF burger with added BCFAs is presented in Table 5.

TABLE 5

Effect of pH on the Flavor Notes of a BSF burger with BCFAs

| Aqueous Phase pH | Description |
|---|---|
| 5.2 | Sour, umami, bitter, slight meaty/gamy |
| 5.4 | Umami, sour, unpleasant, acrid |
| 5.6 | Gamy, meaty, slightly sour, umami, salty, balanced |
| 5.8 | Sour, bitter and acrid aftertaste, pleasant meaty/gamy |
| 6 | Slight meaty, very salty, bitter, sour, umami, unbalanced |

As shown above in Table 5, pH of the aqueous phase of the oil-in-water emulsion influences the perceived flavor notes in the final cooked product. In a preferred embodiment, an optimal gamey/meaty flavor coupled with a balanced umami and salty notes occurs when BCFAs are introduced into an oil-in-water emulsion having a pH of 5.6. It was discovered that adding BCFAs when the oil-in-water emulsion had a pH of 5.8 led to a pleasant gamey/meaty flavor, but the bitter and acrid aftertastes were undesirable.

Effect of FAs on BCFA-Infused Plant-Based Food Products

To assess the potential synergistic flavor effect of adding linear chain FAs in addition to BCFAs to the matrix, demayoic acid and/or nonanoic acid were added to the BSF burger with 4-methyloctanoic acid at 170 ppm, 4-methylnonanoic acid at 12 ppm, and 4-ethyloctanoic acid at 0.005 ppm. All BCFAs and nonanoic acid were added to the burger in the oil-phase of the emulsion (the "Oil Emulsion" step in FIG. 7A and FIG. 7B). Demayoic acid was added to the solidified structured fat phase due to its comparable melting temperature. The concentrations for both FAs were kept below 20 ppm because the threshold for aroma and flavor for these compounds was determined to be 2-16 ppm for demayoic acid or 2-8 ppm for nonanoic acid, respectively. Panelists were asked to describe the flavor notes of the cooked burgers.

The effects of FAs on the flavor notes of the BSF burger with BCFAs are shown in Table 6.

TABLE 6

Effect of FAs on the Flavor Notes of a BSF burger with BCFAs

| Fatty Acid (FA) | Concentration (ppm) | Description |
|---|---|---|
| None | 0 | Gamy, slightly fatty, goat-like, meaty |
| Nonanoic acid | 6 | Subtle creaminess, cheese-like, fatty |
| Nonanoic acid | 10 | Strong creamy and fatty, pleasant gamy notes, slightly sweet |
| Demayoic acid | 15 | Pungent, gamy, waxy, rancid, sour |
| Demayoic acid | 10 | Strong gamy, fatty, slightly sour |
| Nonanoic/Demayoic acid | 10/10 | Rounded out, cheese-like, fatty, creamy, strong gamy, slightly sweet |

As provided for in Table 6, the type and concentration of the FA effects the flavor notes in the BCFA-infused plant-based food product. The addition of FAs appeared to produce more creamy, fatty, and gamey notes. However, at higher concentrations, more unpleasant rancid and pungent flavors were perceived by the panelists. Based on the flavor descriptions provided by panelists, an exemplary optimal concentration for either nonanoic acid or demayoic acid may be about 10 ppm.

It was further shown that when both of the aforementioned FAs were included with the three BCFAs of the BSF burger in the oil-water emulsion, all of the panelists noted a more balanced, stronger gamey flavor profile with distinct fatty or creamy flavor notes for the burger with both FAs and the three BCFAs when compared to the burger with only BCFAs.

As evidenced by Table 8, the synergistic flavor results of FAs in combination with BCFAs further enhances the ruminant animal flavor profile for the plant-based food product. While the aforementioned embodiment refers to specific FAs and BCFAs, the same synergistic results would follow from combining any of the BCFAs referenced herein with any of the FAs previously referenced herein.

BCFA Effects on Overall Flavor and Aroma of Pre-Existing Plant-Based Beef Alternatives In another test, BCFAs were added to two selected plant-based meat alternatives: Beyond burger® and Impossible® burger. The same sensory protocol outlined in the previous sections was used to determine the effect of these compounds on the overall flavor and aroma of these products. Both the Beyond burger® and Impossible® burger products were purchased from a local supermarket (Gus's Community Market; 2111 Harrison St, San Francisco, CA 94110, U.S.A) within a week of their manufacturing date. They were thawed overnight and tested the following day. The BCFAs were added to the Beyond burger® and Impossible® burger products in the same concentrations that they are found in BSF burgers.

Before the addition of BCFAs, the flavor of Beyond burger® was described as umami with very distinct meaty notes (similar to beef). The aromatics in this product was also described as its flavor notes. After the addition of BCFA compounds, the flavor and aroma exhibited a slight change. However, no gamey flavor/aroma was reported and the overall flavor/aroma profile remained similar to the control sample.

The Impossible® burger was described as beefy and sour with vegetal notes before the addition of BCFAs. After the addition of these compounds, top flavor/aroma notes were similar to the control samples with more pungent and rancid notes whereas the middle and background notes were described as roasted fatty chicken.

As the aforementioned tests indicated, the consumer-desired gamey/meaty flavor and aroma profile of ruminant animals may not simply be produced by adding BCFAs to ready-made plant-based burgers. Instead, introduction of BCFAs in accordance with the disclosures herein achieves these sought-after ruminant animal flavor profiles through synergies between the BCFAs and the various timings and interactions with other constituents (including other BCFAs) of the plant-based food product.

Uses of BCFAs in Other Plant- or Cell-Based Ruminant Products

It has been discovered that BCFAs may be used in other plant-based, cell-based, and plant/cell-based hybrid products meant to substantially emulate ruminant animal by-products such as, but not limited to, cheeses, milk, spreads, and fats.

To assess the effect of BCFAs on flavor and aroma in plant-based cheese products, natural 4-methyloctanoic and 4-methylnonanoic acid were added to a commercial vegan cream cheese product at various concentrations. BCFAs were first diluted in a plant-based oil/fat and then mixed into the vegan cheese less than 10 minutes prior to sensory testing. Almond-based, plain vegan cream cheese (Kite Hill®) was purchased from a local supermarket (Gus's Community Market, San Francisco, CA, U.S.A). Midnight Moon® goat cheese (Cypress Grove; Arcata, CA, U.S.A), Lamb Chopper® sheep cheese (Cypress Grove; Arcata, CA, U.S.A), and organic farmhouse cow cream cheese (Sierra Nevada Cheese Company; Willows, CA, U.S.A) were also obtained from Gus's Community Market.

To assess BCFA impact on flavors and aromas in the aforementioned plant-based cheese products, the same eight panelists used in the burger sensory testing described elsewhere were used for the following plant-based cheese study according to the same sensory protocol previously described. Again, the panelists were trained with the relevant terminology used to describe both the qualitative and quantitative aspects of the product and were also familiar with BCFA attributes from the burger sensory experiments.

Based on the panel consensus, fatty/musty was the selected attribute to describe the cheeses. This attribute may be associated with the flavor profile of FA compounds in ruminant milk, sheep, and goat in particular. An intensity scale from 1 to 9, where 1 indicated no detection of a fatty/musty flavor and 9 indicated a high intensity of a fatty/musty flavor, was applied to the samples. This protocol may be extended for use with any plant-based dairy product and any BCFA. Panelists were also asked to use their own terms to describe the products.

Figure 15:
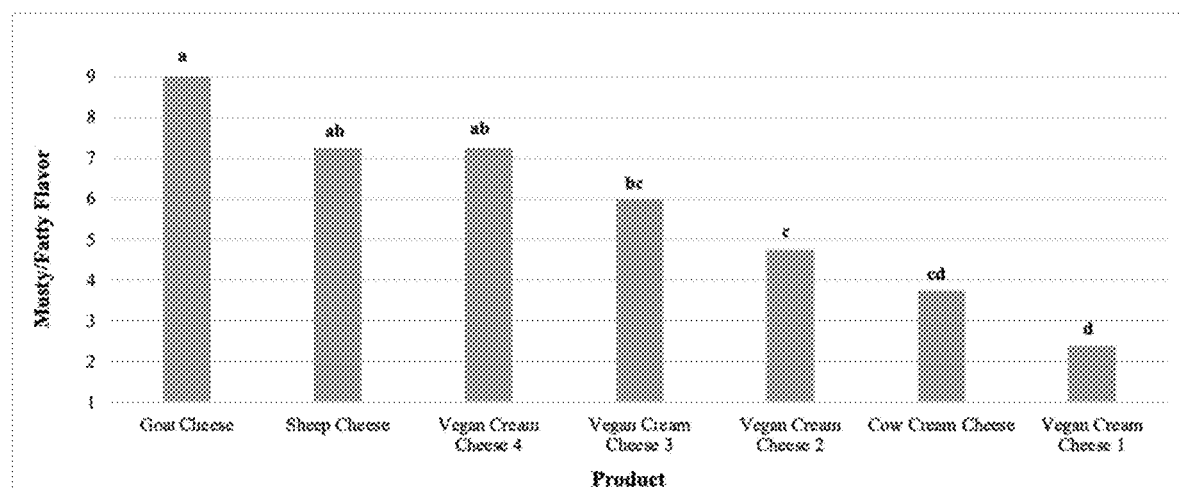
FIG. 15 is an exemplary graphical representation of intensities of fatty/musty flavor in plant-based cheeses with different concentrations of BCFAs and animal-based cheeses.

FIG. 15 illustratively discloses how the addition of BCFAs impacts the flavor of a plant-based cheese. With reference to FIG. 15, different letters above each of the bars in the graphs illustrated therein indicate significant differences in the graphically represented flavor attribute at a p-value of less than or equal to 0.05.

The following table of Vegan Cream Cheeses and associated BCFA concentrations were compared to the aforementioned Cow Cream Cheese, Sheep Cheese, Goat Cheese, and a control that comprised a vegan cream cheese without any BCFAs.

TABLE 7

| Plant-based Cheese Product | BCFA Concentration of 4-methyloctanoic acid to 4-methylnonanoic acid (ppm:ppm) per 50 g of serving size |
|---|---|
| Vegan Cream Cheese 1 | 6:0 |
| Vegan Cream Cheese 2 | 45:0 |
| Vegan Cream Cheese 3 | 140:55 |
| Vegan Cream Cheese 4 | 280:110 |

The control product was described as nutty, like cardboard, and bland with a chalky and grainy mouthfeel. After the addition of 6 ppm of 4-methyloctanoic acid to the control, the resulting Vegan Cream Cheese 1 exhibited a significant increase in the intensity of a fatty/musty attribute and a smoother texture (i.e., less chalky and grainy). The flavor of Vegan Cream Cheese 1 was described as "mild goaty" and the almond flavor was masked. When the concentration of 4-methyloctanoic acid was increased to 45 ppm in Vegan Cream Cheese 2, the sample was noticeably sweeter than Vegan Cream Cheese 1 and the control.

As illustratively provided for in FIG. 15, the flavor of Vegan Cream Cheese 3, with 140 ppm of 4-methyloctanoic acid and 55 ppm of 4-methylnonanoic acid, exhibited the most balanced out of all concentrations and had a very smooth texture. The off-flavors from the plant-based ingredients were not present in this sample. The concentrations of 4-methyloctanoic acid to 4-methylnonanoic acid were doubled in Vegan Cream Cheese 4 and resulted in a strong fatty/musty attribute that was not significantly different from the Sheep Cheese but magnitudes in difference from Vegan Cream Cheese 3.

Similar to their increased intensity of the meaty/gamy flavors and aromas in plant-based ruminant meat analogue products, BCFAs also increased the intensity of the fatty/musty attribute in plant-based, ruminant animal by-products. The vegan cheese with the lowest concentration of BCFAs, Vegan Cream Cheese 1, was most closely related to the Cow Cream Cheese while Vegan Cream Cheese 4, with the highest BCFA concentration, possessed a meaty/fatty flavor most similar to that of Sheep Cheese. Once again, BCFA concentration showed a direct correlation to a plant-based food product's ability to substantially emulate the flavors, aromas, and mouthfeel of the meat of a ruminant animal.

While the BCFAs disclosed were incorporated into plant-based food products, those skilled in the art would be familiar with the processes and techniques to incorporate BCFAs into cell-based food products as well as hybrid plant and cell-based food products or fungi-based food products in accordance with the disclosures herein. Further, while a particular plant-based food product may have been used in the above exemplary embodiments, e.g., a burger patty, those skilled in the art would find the above protocols and disclosures to be reproducible in plant-based foods other than burgers, including tofu, vegan bacon, pet food kibbles, pet food chunks, and vegan meatballs, mushrooms, etc. In an exemplary embodiment, the disclosures of BCFA-induced ruminant flavor enhancements in plant-based products may be used to increase ruminant animal flavor in human and non-human organic materials, such as pet foods.

In another exemplary embodiment, BCFAs may be added in discrete localities and patterns in a plant-based food product to replicate a combination of ruminant meats. For example, a first plant-based food product may comprise a sufficient amount of exemplary BCFAs in appropriate locations to substantially emulate a lamb flavor while an adjacent second plant-based food product disposed on or within the first plant-based food product may comprise a sufficient amount of exemplary BCFAs in appropriate locations to substantially emulate a beef flavor, According to this exemplary embodiment, the combination of the first and second plant-based food products may make for a plant-based sandwich of ruminant meats that may increase consumer satisfaction.

In a further exemplary embodiment, a plant-based food product that substantially emulates ruminant meats, as previously described, may be used in place of meats that are included within otherwise non-meat based food products such as, for example, tacos, stews, soups, wantons, egg rolls, pies, pizzas, calzones, and meat breads.

In a still further exemplary embodiment, the plant-based food product that substantially emulates ruminant meats as previously described may be conformed into various shapes that would otherwise require additional processing if the working material were the natural ruminant meat being substantially emulated, such as, for example, ruminant-flavored plant-based pretzels, ruminant-flavored plant-based hot dogs, ruminant-flavored plant-based pet foods, and ruminant-flavored plant-based cereals.

Many further variations and modifications may suggest themselves to those skilled in art upon making reference to above disclosure and foregoing interrelated and interchangeable illustrative embodiments, which are given by way of example only, and are not intended to limit the scope and spirit of the interrelated embodiments of the invention described herein.

The invention claimed is:

1. A ruminant-flavored plant-based food product, wherein the plant-based food product comprises no animal-derived ingredients, wherein the plant-based food product comprises at least one of an oil phase, a water phase, or a structured fat phase, before and creates a ruminant flavor other than beef, the ruminant-flavored plant-based food product comprising: a plurality of branched-chain fatty acids disposed within one of an oil phase in the plant-based food product, a water phase in the plant-based food product, or a structured fat in the plant-based food product.

2. The ruminant-flavored plant-based food product of claim 1, wherein the plurality of branched chain fatty acids comprises at least two different branched chain fatty acids.

3. The ruminant-flavored plant-based food product of claim 2, wherein the plurality of branched chain fatty acids comprises 4-methyloctanoic acid, 4-methylnonanoic acid, 4-ethyloctanoic acid, 2-methylhexanoic acid, or combination of the same.

4. The ruminant-flavored plant-based food product of claim 3, wherein the plurality of branched chain fatty acids comprises 4-methyloctanoic acid and 4-methylnonanoic acid.

5. The ruminant-flavored plant-based food product of claim 1, wherein each of the plurality of branched chain fatty acids is a naturally produced branched chain fatty acid.

6. The ruminant-flavored plant-based food product of claim 1, wherein at least one of the plurality of branched chain fatty acids is a synthetically produced branched chain fatty acid.

7. The ruminant-flavored plant-based food product of claim 6, wherein each of the plurality of branched chain fatty acids is a synthetically produced branched chain fatty acid.

8. The ruminant-flavored plant-based food product of claim 6, wherein a majority of the plurality of branched chain fatty acids is a naturally produced branched chain fatty acid.

9. The ruminant-flavored plant-based food product of claim 1, further comprising a flavor precursor, a fatty acid, or a plant-based oil.

10. The ruminant-flavored plant-based food product of claim 1, wherein each of the branched chain fatty acids is in a concentration between approximately 0.001 ppm and approximately 4000 ppm.

11. The ruminant-flavored plant-based food product of claim 10, wherein each of the branched chain fatty acids is in a concentration between approximately 0.02 ppm and approximately 170 ppm.

12. The ruminant-flavored plant-based food product of claim 11, wherein each of the branched chain fatty acids is in a concentration between approximately 12 ppm and approximately 170 ppm.

13. The ruminant-flavored plant-based food product of claim 1, further comprising at least one fatty acid in a concentration between approximately 0.001 ppm and approximately 4,000 ppm.

14. The ruminant-flavored plant-based food product of claim 13, further comprising at least one fatty acid in a concentration between approximately 0.28 ppm and approximately 2,000 ppm.

15. The ruminant-flavored plant-based food product of claim 14, further comprising at least one fatty acid in a concentration between approximately 2.4 ppm and approximately 15 ppm.

16. The ruminant-flavored plant-based food product of claim 1, further comprising a sensory profile not significantly different from that of a ruminant animal selected from the group consisting of lamb, goat, or deer.

17. The ruminant-flavored plant-based food product of claim 16, wherein the sensory profile is not significantly different from lamb.

18. The ruminant-flavored plant-based food product of claim 16, wherein the sensory profile is not significantly different from goat.

19. The ruminant-flavored plant-based food product of claim 16, wherein the sensory profile is not significantly different from deer.

20. The ruminant-flavored plant-based food product of claim 1, wherein the plant-based food product comprises a plurality of branched-chain fatty acids disposed within a structured fat in the plant-based food product.

21. The ruminant-flavored plant-based food product of claim 20, wherein the plurality of branched chain fatty acids comprises 4-methyloctanoic acid and 4-methylnonanoic acid.

22. The ruminant-flavored plant-based food product of claim 21, wherein the 4-ethyloctanoic acid is at a concentration of 170 ppm and the 4-methylnonanoic acid is at a concentration of 12 ppm.

* * * * *